United States Patent
Roberts et al.

(10) Patent No.: US 10,011,777 B2
(45) Date of Patent: Jul. 3, 2018

(54) PRODUCTION OF LUBRICANT BASE OILS FROM BIOMASS

(71) Applicants: Virginia M. Roberts, Weehawken, NJ (US); Michel Daage, Hellertown, PA (US); Kun Wang, Bridgewater, NJ (US)

(72) Inventors: Virginia M. Roberts, Weehawken, NJ (US); Michel Daage, Hellertown, PA (US); Kun Wang, Bridgewater, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 315 days.

(21) Appl. No.: 14/054,288

(22) Filed: Oct. 15, 2013

(65) Prior Publication Data
US 2014/0142356 A1    May 22, 2014

Related U.S. Application Data

(60) Provisional application No. 61/727,306, filed on Nov. 16, 2012.

(51) Int. Cl.
C07C 1/32    (2006.01)
C10G 3/00    (2006.01)
(Continued)

(52) U.S. Cl.
CPC ................ *C10G 3/50* (2013.01); *B01J 23/02* (2013.01); *B01J 23/04* (2013.01); *B01J 23/10* (2013.01);
(Continued)

(58) Field of Classification Search
CPC ..... C10G 3/50; C10G 3/44; C10G 3/45; C10G 45/02; C10G 2400/02; C10G 2400/04;
(Continued)

(56) References Cited

U.S. PATENT DOCUMENTS 8,048,290 B2  11/2011  Knuuttila et al.
8,053,614 B2  11/2011  Aalto et al.
(Continued)

FOREIGN PATENT DOCUMENTS

EP    0457665 A1    11/1991

OTHER PUBLICATIONS

Du. Z.; Mohr, M; Ma, X; Cheng, Y.; Lin, X.; Liu, Y.; Zhou, W.; Chen, P.; Ruan, R.; "Hydrothermal pretreatment of microalgae for production of pyrolytic bio-oil with a low nitrogen content", Biores. Tech, 120 (Jun. 13, 2012), pp. 13-18.*

(Continued)

*Primary Examiner* — Philip Y Louie
*Assistant Examiner* — Aaron W Pierpont
(74) *Attorney, Agent, or Firm* — Amanda K. Jenkins

(57) ABSTRACT

Systems and methods are provided for processing a feed derived from a biomass source that contains nitrogen in the form of fatty amides, e.g., derived from hydrothermal processing of a biomass source feed, while reducing/minimizing the amount of heteroatom removal performed during subsequent/concurrent hydroprocessing. Optionally, the feed can also contain free fatty acids. This is accomplished in part by first exposing the feed to a catalyst comprising a rare earth oxide, alkali oxide, and/or alkaline earth oxide, which can remove the nitrogen heteroatoms from the compounds within the feed or can convert the nitrogen to a form readily removed in subsequent hydroprocessing. The catalyst may also suitable for catalyzing coupling (such as condensation) or conversion reactions of amides, carboxylic (Continued)

acids, carboxylic acid derivatives, and/or other molecules in the feed suitable for participating in the coupling reaction.

15 Claims, 5 Drawing Sheets

(51) Int. Cl.
| | |
|---|---|
| B01J 23/02 | (2006.01) |
| B01J 23/04 | (2006.01) |
| B01J 23/10 | (2006.01) |
| B01J 29/70 | (2006.01) |
| B01J 29/74 | (2006.01) |
| B01J 29/76 | (2006.01) |
| C10G 45/02 | (2006.01) |
| C10G 45/04 | (2006.01) |
| C10G 45/08 | (2006.01) |
| C10G 45/10 | (2006.01) |
| C10G 45/12 | (2006.01) |

(52) U.S. Cl.
CPC ......... *B01J 29/703* (2013.01); *B01J 29/7046* (2013.01); *B01J 29/7461* (2013.01); *B01J 29/7492* (2013.01); *B01J 29/7661* (2013.01); *B01J 29/7692* (2013.01); *C10G 3/44* (2013.01); *C10G 3/45* (2013.01); *C10G 45/02* (2013.01); *C10G 45/04* (2013.01); *C10G 45/08* (2013.01); *C10G 45/10* (2013.01); *C10G 45/12* (2013.01); *C10G 2300/1014* (2013.01); *C10G 2300/1018* (2013.01); *C10G 2300/202* (2013.01); *C10G 2300/302* (2013.01); *C10G 2300/305* (2013.01); *C10G 2300/307* (2013.01); *C10G 2400/02* (2013.01); *C10G 2400/04* (2013.01); *C10G 2400/10* (2013.01); *Y02P 30/20* (2015.11)

(58) Field of Classification Search
CPC ....... C10G 2400/10; B01J 23/02; B01J 23/10; B01J 29/703; B01J 29/7046; B01J 29/7461; B01J 29/7492; B01J 29/7661; B01J 29/7692
USPC .......................................... 585/310, 240, 734
See application file for complete search history.

(56) References Cited

U.S. PATENT DOCUMENTS

| | | | |
|---|---|---|---|
| 2007/0244343 A1* | 10/2007 | Brevoord ................ | C07C 45/48 568/354 |
| 2008/0302001 A1* | 12/2008 | Koivusalmi ............ | C10G 45/62 44/308 |
| 2009/0124839 A1* | 5/2009 | Dumesic .............. | C07D 307/08 585/251 |
| 2009/0301930 A1 | 12/2009 | Brandvold et al. | |
| 2010/0170147 A1* | 7/2010 | McNeff ................. | C10B 19/00 44/605 |
| 2012/0047795 A1 | 3/2012 | Zhou et al. | |
| 2012/0055077 A1* | 3/2012 | Savage .................... | C10L 1/02 44/307 |
| 2012/0232299 A1 | 9/2012 | Bartek et al. | |

OTHER PUBLICATIONS

Reinz, M.; "Ketonization of Catboxylic Acids by Decarboxylation: Mechanism and Scope", Eur. J. Org. Chem. (2005), pp. 979-988.*
Santillan-Jimizez et al., "Catalytic deoxygenation of fatty acids and their derivatives to hydrocarbon fuels via decarboxylation/decarbonylation", Journal of Chemical Technology & Biotechnology, Aug. 26, 2012, pp. 1041-1050, vol. 87, No. 8.
International Search Report with Written Opinion for PCT/US2013/065043 dated Apr. 24, 2014.

* cited by examiner

PRODUCTION OF LUBRICANT BASE OILS FROM BIOMASS

CROSS-REFERENCE TO RELATED APPLICATIONS

This application claims the benefit of U.S. Provisional Application Ser. No. 61/727,306 filed on Nov. 16, 2012; which is incorporated herein in its entirety by reference.

FIELD OF THE INVENTION

This invention relates to methods for processing biomass to make distillate products.

BACKGROUND OF THE INVENTION

Developing renewable sources of feedstocks based on biomass for making distillate products, such as fuels or lubricants, is an area of ongoing interest. Use of biomass as a feedstock source is attractive from a perspective of avoiding depletion of mineral oil and gas sources. However, a variety of challenges remain in developing technologies for harvesting and processing feeds derived from biomass.

In addition to the challenges for making fuels from feeds derived from biomass, production of lubricant base oils from renewable sources poses additional problems. One difficulty is that renewable feeds are typically more likely to contain molecules with chain lengths and/or molecular weights corresponding to the diesel boiling range. For example, fatty acids present in some types of biomass typically have carbon chain lengths of 20 atoms or less, which usually corresponds to a diesel boiling range molecule. Biomass feeds with molecules having chain lengths in the lubricant base oil boiling range are currently less common. One option for making a lubricant base oil product from a feed containing fatty acids is to couple two or more fatty acid chains to create molecules with longer chain lengths.

European Patent Application No. EP 0457665 describes performing a condensation reaction on carboxylic acids or polyfunctional compounds such as triglycerides using a catalyst based on an iron-containing mineral, such as bauxite.

U.S. Pat. No. 8,048,290 describes a process for producing branched hydrocarbons. A feedstock derived from a biological starting material, such as a fatty acid or a fatty acid derivative, is subjected to a condensation step to produce hydrocarbons that also contain one or more heteroatoms, such as oxygen or nitrogen. The condensation product is then subject to a combined hydrodefunctionalization and isomerization step. In this combined step, isomerization and heteroatom removal are performed in the same step. Examples of suitable catalysts for performing the combined hydrodefunctionalization and isomerization step include alumina bound ZSM-23 or SAPO-11 with supported Pt as a hydrogenation metal. ZSM-48 is also mentioned as a suitable zeolite.

U.S. Pat. No. 8,053,614 describes a method for producing a base oil. In various options, triglyceride containing feeds are converted to fatty acids or fatty acid alkyl esters. The fatty acids or fatty acid esters are then used to form ketones via a m condensation reaction. The ketones are then deoxygenated in a hydrogenation step to form paraffins, which were then isomerized. One or more distillation or separation steps are included at various points in the process of converting the triglyceride containing feed to the isomerized paraffin.

SUMMARY OF THE INVENTION

In an embodiment, a method is provided for processing an amide-containing feedstock. The method includes exposing a feedstock containing at least about 1.0 wt % nitrogen and at least about 5 wt % fatty amides to a first catalyst comprising at least about 5 wt % of a rare earth metal salt, an alkali metal salt, an alkaline earth metal salt, or a combination thereof under effective deoxygenation conditions to form an effluent containing ketones; separating the effluent to form at least a gas phase effluent and a liquid effluent containing ketones; and exposing at least a portion of the liquid effluent to a hydroprocessing catalyst under effective hydroprocessing conditions to form a deoxygenated effluent, wherein an average carbon number of the ketones in the liquid effluent is greater than 1.5 times an average carbon number for the combined fatty amides, fatty acids, and fatty acid derivatives.

In another embodiment, a method is provided for processing a feedstock. The method includes exposing a pyrolysis oil feedstock with a pH of about 4 or less to a catalyst comprising at least about 5 wt % of a rare earth metal salt, an alkali metal salt, an alkaline earth metal salt, or a combination thereof, under effective conditions to form an effluent with a pH greater than about 4; and exposing at least a portion of the effluent with a pH greater than about 4 to a hydroprocessing catalyst under effective hydroprocessing conditions to form a deoxygenated effluent.

In still another embodiment, a method is provided for processing an amide-containing feedstock. The method includes exposing a feedstock containing at least at least 5 wt % fatty amides to a catalyst comprising at least about 5 wt % of a rare earth metal salt, an alkali metal salt, an alkaline earth metal salt, or a combination thereof in the presence of hydrogen under effective deoxygenation conditions to form an effluent containing ketones, the weight percentage of ketones in the effluent being at least about 50% of the combined weight percentage of fatty amides, fatty acids, and fatty acid derivatives in the feedstock; and exposing, without intermediate separation, at least a portion of the effluent containing ketones to a hydroprocessing catalyst under effective hydroprocessing conditions to form a deoxygenated effluent, wherein an average carbon number of the ketones in the effluent is greater than 1.5 times an average carbon number for the combined fatty amides, fatty acids, and fatty acid derivatives.

DETAILED DESCRIPTION OF THE EMBODIMENTS

Figure 1:
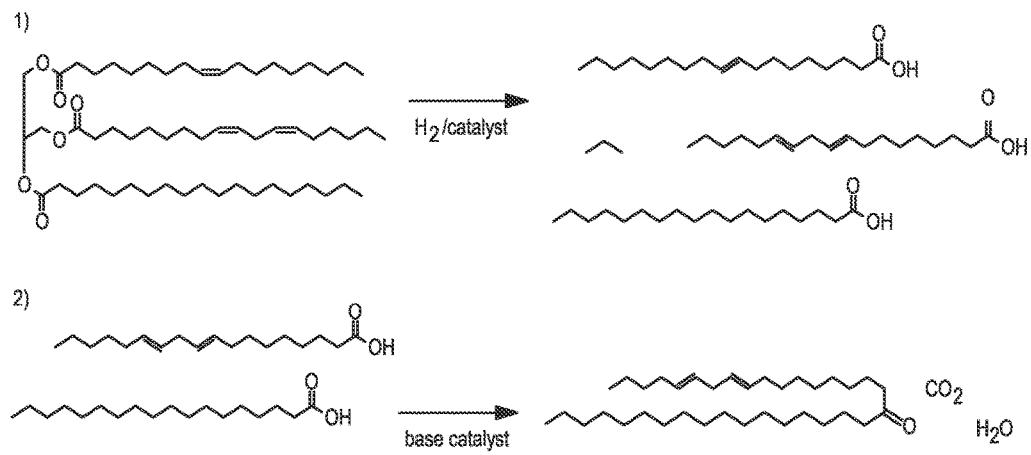
FIG. 1 shows a reaction sequence for converting a triglyceride to a ketone.

In various embodiments, methods are provided for processing of bio oils with elevated nitrogen contents. The ability to process bio oils with elevated nitrogen contents allows for greater processing flexibility when processing biomass feeds that contain proteins, such as a biomass feed containing proteins that is derived from an algae source, where the feed is subsequently treated by hydrothermal processing.

For oils derived from a biological source, oxygen is a known heteroatom that poses challenges during processing. Nitrogen is typically not as great a concern for bio oils, as it is typically present only in low concentrations. However, in oils that are recovered via hydrothermal processing of a feed from a biomass source (such as algae) under sufficiently severe processing conditions, up to about 6 wt % nitrogen can be incorporated into the resulting oil. As the severity of hydrothermal processing is increased, the conversion and/or extraction efficiency can also increase. While increasing the conversion or extraction efficiency can be beneficial, hydrothermal processing of protein-rich biomass sources at higher severity can also lead to increased nitrogen content for the resulting extracted products. This has conventionally been viewed as less desirable, as the resulting bio oil can contain substantial amounts of both oxygen heteroatoms and nitrogen heteroatoms, which can make the resulting bio oil difficult to handle in any further processing stages.

A large fraction of the nitrogen in a bio oil derived from high severity hydrothermal processing of a biomass feed can be in the form of amides, including substituted amides. The amides (and/or substituted amides) are believed to be formed through condensation reactions of ammonia or other amines with free fatty acids, such as free fatty acids generated by hydrolysis of triglycerides. The ammonia and/or amines for amide formation are believed to be derived from protein hydrolysis and/or further degradation of amino acids in the reaction environment. Due to the nature of a hydrothermal processing environment, the ammonia and/or amines are readily dissolved in the water used as the hydrothermal processing medium.

Another potential difficulty in processing feeds derived from biomass sources can be the presence of high acid contents in some biomass feeds. For example, carboxylic acids and/or carboxylic acid derivatives can often be present in feeds derived from biomass sources. Such acids can contribute to high values of a total acid number (TAN) for a feed derived from a biomass source. While feedstocks with high TAN values can be treated by hydroprocessing, high TAN values can complicate such processing, e.g., due to the corrosivity of high TAN feedstocks. A high TAN value also usually indicates the presence of a large number of heteroatoms. Increasing amounts of heteroatoms in a feed can typically require increased hydrogen consumption during hydroprocessing to remove the heteroatoms and/or to lower the TAN value.

Another example of a feed with high levels of heteroatoms is a pyrolysis oil feed. Pyrolysis oil is derived from biomass by heating the biomass in an anaerobic environment. This can result in production of solid charcoal type product, a light ends product, and an approximately distillate boiling range (or higher) product corresponding to the pyrolysis oil. The pyrolysis oil can typically be acidic, with a pH typically of less than 4. Instead of containing fatty acids, the pyrolysis oil can typically contain larger amounts of carboxylic acids with shorter chain lengths. The pyrolysis oil may not be directly suitable for use as a diesel fuel, due in part to cold flow properties and the high acidity. However, the high acidity can also increase the difficulty of processing the pyrolysis oil using conventional hydroprocessing techniques. In addition, pyrolysis oils can have oxygen contents corresponding to as much as 30-40 wt % of the pyrolysis oil feed. Thus, hydroprocessing of a pyrolysis oil can require large amounts of hydrogen to allow for removal of the substantial oxygen content of the pyrolysis oil feed. Exposing pyrolysis oil to a catalyst suitable for catalyzing a coupling or conversion reaction can provide a method for both reducing the acidity of the pyrolysis oil and reducing its oxygen content. This can allow for lower hydrogen consumption during hydroprocessing of the pyrolysis oil as well as improving overall processability for a pyrolysis oil feed.

In various aspects, systems and methods are provided for processing a feed derived from a biomass source that contains nitrogen in the form of fatty amides, such as a feed derived from hydrothermal processing of a biomass source feed, while reducing or minimizing the amount of heteroatom removal performed (or required) during a subsequent or concurrent hydroprocessing step. Optionally, the feed can also contain free fatty acids. This can be accomplished in part by first exposing the feed to a catalyst comprising a rare earth oxide, alkali oxide, and/or alkaline earth oxide. The catalyst can be effective for converting the nitrogen in the feed either by removing the nitrogen heteroatoms from the compounds within the feed or by converting the nitrogen to a form that can be readily removed in a later hydroprocessing stage. Preferably, the catalyst can also be suitable for catalyzing a coupling (such as condensation) or conversion reaction of amides, carboxylic acids, carboxylic acid derivatives, and/or other molecules in the feed that are suitable for participating in the coupling reaction. For example, in a feed containing fatty amides, fatty acids, and/or fatty acid derivatives, exposing the feed to a catalyst suitable for catalyzing a coupling or conversion reaction can allow for formation of ketones from two fatty amide, fatty acid, and/or fatty acid derivative molecules. Such a reaction can also result in production of small molecule(s) containing the heteroatoms eliminated during the conversion reaction, such as water, ammonia, carbon monoxide, and/or carbon dioxide. Such small molecules can be separated from the effluent of the conversion reaction in any convenient manner, such as by performing a separation based on boiling point. This separation can occur prior to and/or after hydroprocessing of the conversion reaction effluent. Separation prior to hydroprocessing can also have the advantage of removing nitrogen and carbon monoxide contaminants from the effluent of the conversion reaction, as increased nitrogen and/or carbon monoxide concentration can often have a negative impact on the activity of hydroprocessing catalysts.

In some aspects, systems and methods are provided for processing a feed containing fatty amides, (and optionally free fatty acids and/or (tri)glycerides) in a single bed and/or single reactor configuration to form distillate boiling range molecules. The methods can allow for conversion of fatty amide, free fatty acid, and glyceride molecules to isomerized lubricant and diesel boiling range products without an intermediate separation. The methods can be enabled by use of a dewaxing catalyst having enhanced activity and tolerance of the water generated during deoxygenation of an oxygen-containing feed. The methods can be additionally or alternately suitable for conversion of feeds containing free fatty acids and/or fatty acid derivatives such as fatty acid esters. Alternatively, a separation can be performed after the coupling reaction to remove ammonia generated during the coupling reaction from the effluent. A separation to remove ammonia can reduce the amount of catalyst poisoning for the dewaxing catalyst.

One potential use for a feed containing fatty amides, substituted fatty amides, fatty acids, and/or fatty acid derivatives (including glycerides, which can be viewed as a type of fatty acid derivative) can be to combine two or more carbon chains from the fatty molecules to form a larger molecule. For example, the carbon chain length for biologically derived fatty molecules can often be about 14-22 carbons long, making a molecule derived from such a carbon chain more suitable for use as a diesel fuel product. By combining carbon chains from two fatty molecules to form a larger molecule, the fatty molecules can be converted to molecules that correspond to a lubricant base oil boiling range. For example, a coupling reaction can be used to combine two carboxylic acids (such as fatty acids) to form a ketone. Additionally or alternately, fatty amides, substituted fatty amides, or fatty acid derivatives (including glycerides) can participate in such coupling reactions.

Reactions for Nitrogen and Oxygen Removal

Several possible reaction pathways are available for removal of nitrogen heteroatoms in a hydrocarbon feed, such as nitrogen in an amide group. One potential reaction pathway is to remove the nitrogen atom in the amide as $NH_3$ or an amine while the oxygen is removed as $H_2O$. In this type of reaction mechanism, no carbons are removed from the fatty carbon chain during heteroatom removal. Removal of the nitrogen and oxygen atoms of an amide group can consume ~3 moles of hydrogen per amide group, which includes the hydrogens needed to terminate the end of the hydrocarbon chain. The resulting ammonia and water generated by amide removal in this mechanism are potential poisons for catalysts in a hydroprocessing stage, such as a subsequent dewaxing stage. This nitrogen removal mechanism has been described as a standalone reaction, but this removal mechanism can also occur as part of a larger reaction scheme, such as coupling together of an amide with another amide or free fatty acid molecule to form a ketone.

Another option for removing an amide group is to convert the amide into a nitrile group. Conversion of an amide to a nitrile group is not strictly a nitrogen removal reaction, as the nitrogen is retained in the molecule while the oxygen is eliminated as water. However, conversion of an amide to a nitrile can allow for subsequent removal of the nitrogen atom. Depending on the reaction conditions, the nitrogen atom in the nitrile can be removed either as ammonia or as HCN. Formation of HCN can be favored by higher temperatures and use of selected catalysts, such as oxides of Al, Cr, Mg, Zn, or Mn. One advantage of eliminating nitrogen from nitriles as HCN is that only ~½ of the amount of hydrogen is required for forming the HCN and terminating the remaining carbon chain as compared to removing the nitrogen as an ammonia molecule. However, removal of nitrogen as HCN can also shorten the carbon chain of the resulting product. Additionally, an additional treatment step for treatment of light ends generated during hydroprocessing may be necessary to separate out hydrogen cyanide generated during removal of a nitrile group. It is noted that this reaction mechanism for nitrogen removal is believed to be less likely to lead to ketone formation.

In some embodiments, a feedstock can include free fatty acids. Removal of oxygen heteroatoms from a hydrocarbon feedstock can typically occur via at least one of three reaction pathways. These reaction pathways for oxygen removal may occur separately, resulting in removal of oxygen from a carbon chain without further reaction. However, the concepts of these reaction pathways can also be used in order to describe oxygen removal reactions that occur as part of a larger reaction scheme, such as oxygen removal that occurs as part of a coupling reaction to combine two free fatty acids (or fatty amides) to form a larger ketone molecule.

One potential reaction pathway for oxygen removal is hydrodeoxygenation. In a hydrodeoxygenation reaction, oxygen is typically removed from feed molecule as water. The carbon chain for the feed molecule tends to remain intact after a typical hydrodeoxygenation reaction. Water is typically a contaminant that can contribute to deactivation of some conventional dewaxing catalysts, such as conventional alumina bound zeolite catalysts. However, by itself water typically does not lead to corrosion within a reaction system. Additionally, removing oxygen as water tends to maintain the chain length of a feed molecule. Maintaining the chain length of molecules intended for use as a fuel or fuel blending product can usually be beneficial, as a greater percentage of the carbon from the feed can thus be incorporated into the final fuel product.

Another potential reaction is (hydro)decarboxylation, which includes removing oxygen by forming $CO_2$ from biofeeds. This $CO_2$ tends to form carbonic acid when combined with water. Carbonic acid corrosion may require metallurgical upgrades to carbon steel in downstream equipment, particularly fin fans, heat exchangers, and other locations where liquid water can be present prior to an amine scrubbing system or other system for removing $CO_2$.

Still another potential reaction is (hydro)decarbonylation, which includes removing oxygen by forming CO from biofeeds. CO is a known inhibitor for hydrodesulfurization. For example, 1000 ppm CO can deactivate a conventional CoMo supported catalyst by at least ~10%. CO is also typically not removed in appreciable quantities by conventional amine scrubbing systems. As such, CO can build up through gas recycle and can be cascaded to downstream hydrotreatment, dewaxing, and/or hydrofinishing stages. As a result, removing oxygen from a biocomponent feed as CO may require the use of pressure swing adsorbers (including rapid cycle pressure swing adsorbers) or other gas cleaning equipment in order to remove CO from a reaction system.

Depending on the conditions present in a reactor, the relative amounts of CO and $CO_2$ in a reactor can be modified by the water gas shift reaction. The water gas shift reaction is an equilibrium reaction where $CO_2$ and $H_2$ can be converted into CO and $H_2O$. Due to the water gas shift reaction, the amount of decarbonylation and decarboxylation may not be clear, due to conversion from one form of carbon oxide to another. Hydrodeoxygenation can be distinguished at least in part from decarbonylation and decarboxylation, e.g., by characterizing the odd versus even numbered carbons in a deoxygenated product.

Most catalysts used for performing a catalytic deoxygenation of a biocomponent feed can be less than 100% selective for a given pathway. Instead, at least some deoxygenation of a feed can typically occur via each of the three pathways mentioned above during a typical catalytic deoxygenation of a feed. During hydroprocessing, the relative amounts of deoxygenation by each method can vary depending on the nature of the catalyst and the reaction conditions.

More generally, the relative amounts of deoxygenation via each type of reaction pathway can also be impacted when deoxygenation occurs as part of a larger reaction process. For example, a coupling reaction between free fatty acids to form a ketone can typically generate both a water molecule and a carbon dioxide molecule as side products. Thus, in forming a single ketone molecule, one of the two free fatty acid reactants can be viewed as undergoing hydrodeoxygenation while the other free fatty acid reactant can effectively undergo hydrodecarboxylation. When oxygen removal occurs as a result of such a coupling reaction, there is a strong preference for the oxygen removal to occur in the above manner.

Because feeds derived from biological sources typically have carbon chains with even numbers of carbon molecules, hydrodeoxygenation can be distinguished from decarbonylation and decarboxylation based on the carbon chain length of the resulting molecules. Similarly, reaction schemes that generate reaction products similar to the products from hydrodeoxygenation can be distinguished from reaction schemes that generate products similar to the products from decarbonylation or decarboxylation. Because naturally occurring fatty acids typically contain even numbers of carbons, hydrodeoxygenation typically leads to production of molecules with an even number of carbon atoms, while decarbonylation and decarboxylation typically leads to molecules with an odd number of carbon atoms. A similar type of effect can be seen in condensation reactions to form ketones from free fatty acids, where a combination of a free fatty acid having carbon chain length "x" with a free fatty acid having carbon chain length "y" results primarily in formation of ketones with a chain length of "x+y−1".

Conversion of Amides, Acids, and Acid Derivatives to Ketone-Containing Product

A catalyst suitable for facilitating a coupling or conversion reaction to form ketones from amides (including substituted amides), carboxylic acids, and carboxylic acid derivatives can be a catalyst that includes a rare earth metal, such as a metal salt of a rare earth metal, an alkali metal, an alkaline earth metal, or a combination thereof. Some suitable catalysts include clay materials containing a rare earth metal, an alkali metal, and/or an alkaline earth metal. For example, hydrotalcite is a clay that includes magnesium hydroxide. Other examples of suitable catalysts include support materials impregnated with a rare earth metal salt, an alkali metal salt, and/or an alkaline earth metal salt, such as an oxide, hydroxide, or carbonate. For example, a refractory support such as titanium oxide, zirconium oxide, and/or cerium oxide can be impregnated with a lanthanum, sodium, and/or potassium salt, such as potassium carbonate. Still other examples of suitable catalysts include bulk and/or supported versions of rare earth, alkali, or alkaline earth metal salts, such as magnesium oxide and/or cesium oxide. More generally, alkali metal salts can include salts of Na, K, Rb, and/or Cs, while alkaline earth metal salts can include salts of Mg, Ca, Sr, and/or Ba. Rare earth metal salts can include, but are not limited to, salts of La, Ce, Nd, and/or Y. Thus, a reference herein to a rare earth metal or rare earth metal salt is defined to include at least La, Ce, Nd, and/or Y.

A suitable catalyst can include at least about 5 wt % of a rare earth metal salt, alkali metal salt, or alkaline earth metal salt, relative to the total catalyst weight, for example, at least about 15 wt % or at least about 25 wt %. For catalysts based on clays, the catalyst can include about 75 wt % or less of rare earth metal salt, alkali metal salt, or alkaline earth metal salt, for example, about 50 wt % or less, about 35 wt % or less, or about 25 wt % or less. For supported catalysts, the catalyst can include about 35 wt % or less of rare earth metal salt, alkali metal salt, or alkaline earth metal salt, for example, about 25 wt % or less or about 15 wt % or less. In general, higher percentages of a rare earth metal salt, an alkali metal salt, or an alkaline earth metal salt can be desirable, but practical factors may limit the amount of rare earth metal salt, alkali metal salt, and/or alkaline earth metal salt. For example, supported catalysts may be limited based on the amount of salt that can be impregnated or otherwise added to a support in a manner stable in the reaction environment. Similarly, the amount of rare earth metal salt, alkali metal salt or alkaline earth metal salt present in a clay may be limited in order to form a stable clay.

It is noted that the some of the catalysts that are suitable for catalyzing a coupling reaction can also be suitable for converting amides to cyanide groups via an alternative reaction pathway. As noted above, catalysts including oxides of Mg, Ca, or Al can facilitate conversion of amides to cyanide groups. A coupling catalyst that includes oxides of Mg, Ca, or Al can likely convert at least a portion of amides to cyanide groups as a competing reaction to coupling the amides to form ketones. It is noted that Mg, Ca, or Al oxides may be present as a support material for a coupling catalyst.

To convert fatty amides, substituted fatty amides, fatty acids, and/or fatty acid derivatives to ketones, a suitable feedstock can be exposed to a catalyst containing a rare earth metal, alkali metal, and/or alkaline earth metal under effective conditions for performing the conversion reaction. The effective conditions for the conversion reaction can include a temperature from about 300° C. to about 450° C. It is not believed that hydrogen gas is required to facilitate the condensation reaction. However, in aspects where a single reactor is used both for forming ketones as well as deoxygenation and for isomerization of a feed, hydrogen can typically be present in order to facilitate the deoxygenation and isomerization reactions. As a result, in such embodiments, a hydrogen partial pressure of about 1.8 MPag to about 34.6 MPag can typically be present. In such a configuration, the reaction temperature can be from about 300° C. to about 450° C., for example from about 320° C. to about 360° C., in order to balance the benefits of the reactions occurring in the single reaction environment.

Exposure of fatty amides, substituted fatty amides, free fatty acids, and/or fatty acid derivatives (such as glycerides) to a rare earth, alkali metal, and/or alkaline earth metal catalyst can tend to generate a mixture of products. One of the majority products in such a mixture can generally be a fatty ketone. It is believed that fatty ketones are formed via a reaction between carbon chains of two fatty amide, fatty acid, or fatty acid derivative molecules.

FIG. 1 shows an example of a conventional reaction mechanism for conversion of a triglyceride into a fatty ketone. In FIG. 1, a triglyceride is shown as an initial starting molecule. In a conventional reaction mechanism, the triglyceride is hydrotreated, resulting in formation of three fatty acid molecules and a molecule of propane that corresponds to the three carbon backbone. Alternatively, the triglyceride can be hydrolyzed to generate three free fatty acid molecules and one glycerol molecule. The hydrolysis can be acid or base catalyzed. After separating the fatty acid molecules, such as by extraction in an organic solvent, the fatty acids can be condensed to form ketone molecules.

Figure 2:
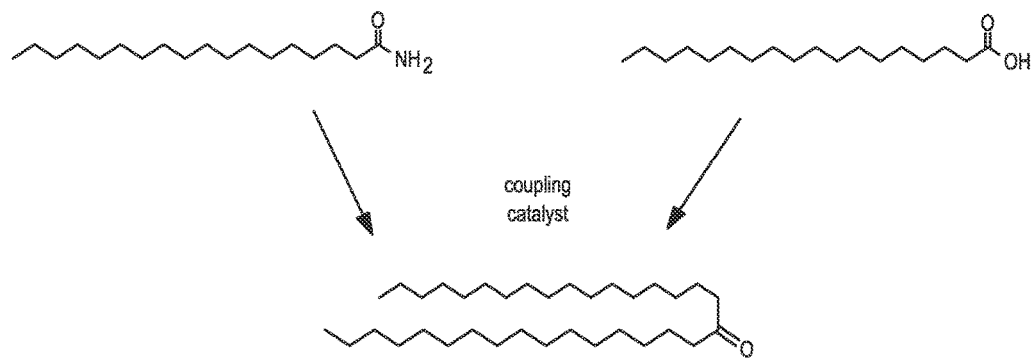
FIG. 2 shows a reaction sequence for converting an amide and a fatty acid to a ketone.

For molecules other than glycerides, such as fatty amides, free fatty acids, or other fatty acid derivatives, a reaction mechanism analogous to the second reaction shown in FIG. 1 can also lead to formation of ketones. FIG. 2 schematically shows an example of a reaction between a fatty amide and a fatty acid to form a fatty ketone.

It is noted that when a feed contains glycerides such as triglycerides, the rare earth, alkali, and/or alkaline earth catalysts according to the invention can allow for the direct conversion of triglycerides and other glycerides to fatty ketones, without requiring an initial step to form the free fatty acid. The addition of hydrogen and/or water to generate free fatty acids may also not be required. Instead, exposing a glyceride-containing feedstock to the rare earth, alkali, and/or alkaline earth metal can allow for direct conversion of glycerides to a mixture of ketones.

Figure 3:
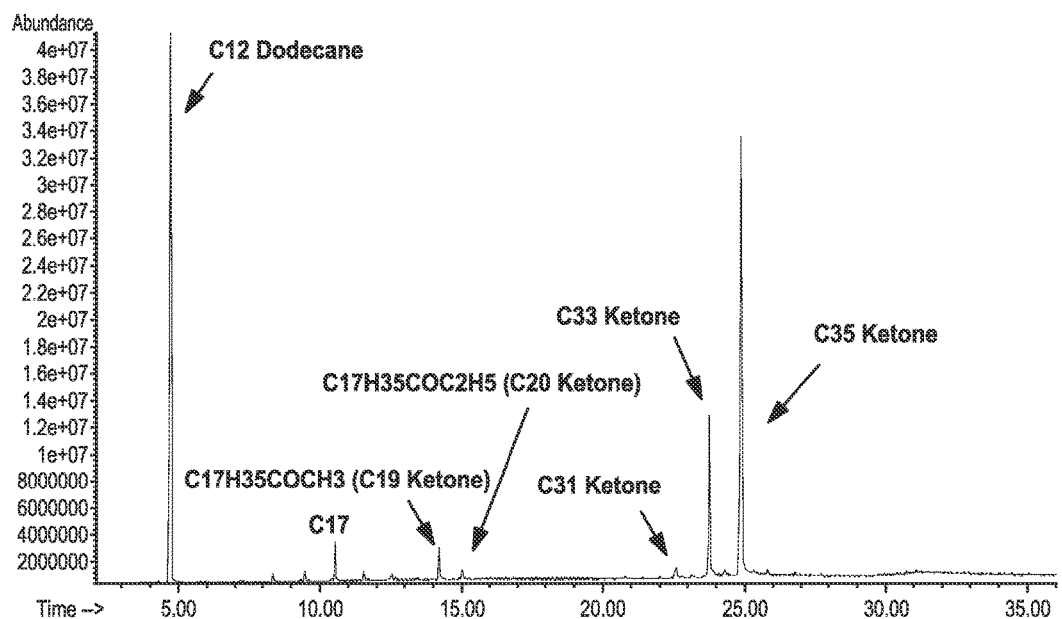
FIG. 3 shows results from processing a triglyceride-containing feed according to an aspect of the invention.

As an example, FIG. 3 shows results from reacting triglycerides over a hydrotalcite catalyst according to the invention. To generate the data shown in FIG. 3, a feed containing the triglyceride tristearin was exposed to a hydrotalcite catalyst at a temperature of about 325° C. and a hydrogen partial pressure of about 400 psig (about 2.8 MPag) in a batch environment. Although hydrogen was added to this experiment, it is believed that hydrogen is not required for ketone formation. The side chains in tristearin correspond to the fatty acid stearic acid, which is an 18-carbon saturated fatty acid. However, some side chains of other lengths were also present due to impurities in the tristearin feed. With the exception of such impurities, the feed contained approximately 100 wt % of tristearin.

FIG. 3 shows a gas chromatography—mass spectrometry (GC/MS) analysis of the reaction products formed from exposing the tristearin feed to the hydrotalcite catalyst as described above. To perform the GC/MS analysis, dodecane was added to the sample as an internal standard. As shown in FIG. 3, the primary product generated was a $C_{35}$ ketone, which corresponded to the expected ketone that would be generated by a condensation reaction between two stearic acid molecules. Although some $C_{33}$ ketone was observed, it is believed that this product was primarily due to the presence of some side chains corresponding to a 16-carbon fatty acid in the sample. The small peak observed for a $C_{31}$ ketone tends to support this interpretation. Further, it was assumed that some extent of cracking took place, which could have led to the formation of the observed shorter chain $C_{19}$ and $C_{20}$ ketones.

Based on FIG. 3, it is believed that exposing a triglyceride-containing feed (or other glyceride-containing feed) to a rare earth, alkali, and/or alkaline earth catalyst under effective conversion conditions can result in formation of ketones from the triglycerides. Also as shown in FIG. 3, to the degree that the triglyceride sample corresponds to a mixture of side chains with varying numbers of carbons and/or functional groups, the resulting ketones can also have variations in length/functionality.

Figure 4:
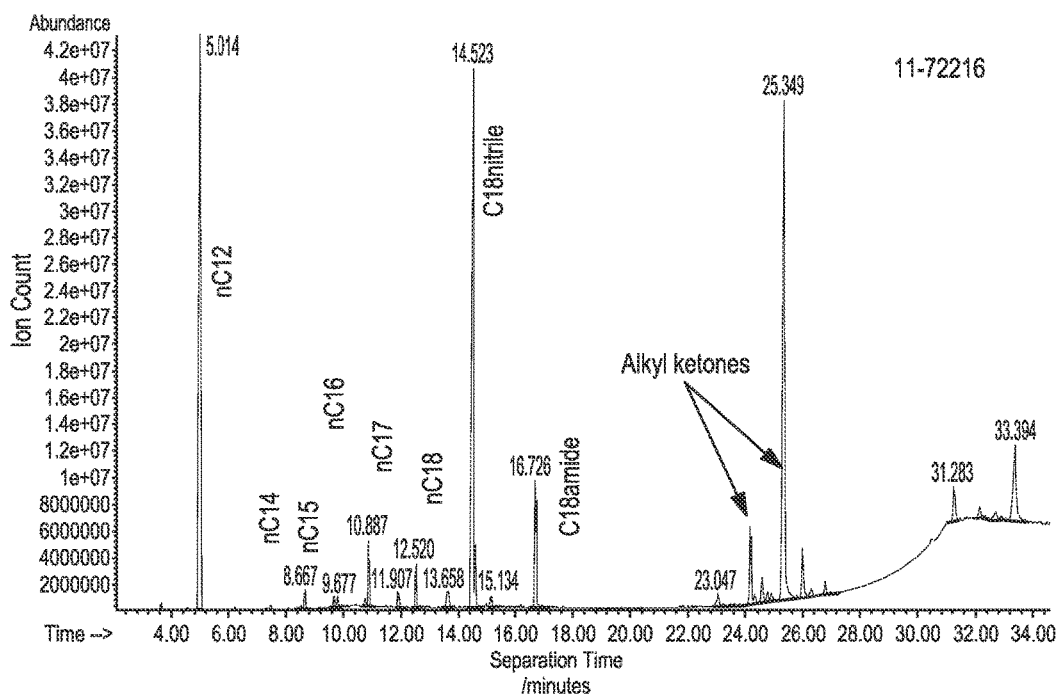
FIG. 4 shows results from processing an amide feed according to an aspect of the invention.

FIG. 4 shows that amides can also be converted over a rare earth, alkali, and/or alkaline earth catalyst under effective conversion conditions to form ketones. The formation of a ketone from two amides and/or an amide and a carboxylic acid or acid derivative reduces the amount of hydrogen required for hydrodeoxygenation and hydrodenitrogenation by two thirds. The sample corresponding to the GC/MS trace shown in FIG. 4 was obtained from reacting ~100% stearamide over a hydrotalcite (Pural™ MG 50, $Mg_{2x}Al_2(OH)_{4x+4}CO_3.nH_2O$, $MgO:Al_2O_3\approx 50:50$) at ~325° C. in a batch reactor (feed/catalyst ratio≈10) in a ~400 psig (~2.8 MPag) hydrogen atmosphere. The reaction time was ~24 hours. ~99.9% conversion of amides took place at these conditions. ~54% of the amides were converted to the long carbon chain ketones or other higher molecular weight compounds. ~29% of the amides were converted to fatty nitriles. Such nitriles can be converted, for example, over conventional hydroprocessing catalysts at a temperature of about 320° C. or greater to remove nitrogen and produce a diesel boiling range hydrocarbon (or other denitrogenated) product. It is noted that formation of a nitrile from an amide includes removal of the carbonyl oxygen from an amide molecule. Consequently, water is not believed to be formed during any subsequent hydroprocessing to convert nitriles into hydrocarbons. Thus, removal of nitriles is believed not to result in water production that might lead to deactivation of conventional hydroprocessing catalysts, especially when alumina bound.

In a second step the ketones can be processed over a hydroprocessing catalyst to remove residual heteroatoms and, if desired, to isomerize the generated paraffins/hydrocarbons/other molecules. Examples of metals for hydrogenation catalysts include, but are not limited to, supported or bulk Ni, Pt, Pd, Ru, Rh, Co, Co—Mo, Ni—Mo, and combinations thereof, as well as their sulfides. The support can be silica, alumina, titania, zirconia, carbon, clay, or a combination thereof.

In order to provide a general way of characterizing the ketones resulting from conversion of a feed containing fatty amides, fatty acids, and/or fatty acid derivatives, the average number of carbons (i.e., average carbon number) in ketones derived from the conversion reaction can be compared with the average number of carbons in the carbon chains of the fatty amides, fatty acids, and fatty acid derivatives in the feed. The average number of carbons in ketones derived from the conversion reaction can be at least about 1.5 times the average number of carbons in the carbon chains of the corresponding fatty amides, fatty acids, or fatty acid derivatives, such as at least about 1.75 times the average number of carbons in the carbon chains or at least about 1.9 times the average number of carbons. Because the feedstock may contain less than 100 wt % of fatty amides, fatty acids, and fatty acid derivatives, the amount of ketones having a specified average carbon number can be normalized by the weight percentage of fatty amides, fatty acids, and fatty acid derivatives in the feed. The weight of ketones in the converted effluent (prior to any deoxygenation) having a specified average number of carbons can be at least 0.4 times the combined weight of fatty amides, fatty acids, and fatty acid derivatives in the feedstock, for example at least 0.6 times the weight or at least 0.75 times the weight. For example, consider a feed containing ~50 wt % of fatty amides, fatty acids, or fatty acid derivatives with an average carbon number of 18 for the carbon chains. In such an example, the converted effluent can contain at least ~20 wt % of ketones (at least 0.4 times the weight of fatty amides, fatty acids, and fatty acid derivatives) with an average carbon number of at least 27 (at least 1.5 times the average carbon number for the carbon chains). Additionally or alternately, such a converted effluent could contain at least ~30 wt % ketones (at least 0.6 times the weight of triglycerides) having an average carbon number of at least 27, and/or at least ~37.5 wt % ketones (at least 0.75 times the weight of triglycerides) having an average carbon number of at least 27.

In some aspects, a feed may contain substantial quantities of both glycerides and fatty amides (including substituted fatty amides), fatty acids, and/or fatty acid derivatives. For example, the weight of glycerides in a feedstock may be at least about 10% of the combined weight of glycerides and fatty amides, fatty acids, and other fatty acid derivatives, for example at least about 25% of the combined weight. In such an aspect, the ketones resulting from the conversion reaction can be characterized relative to the combined properties of the glycerides, fatty amides, fatty acids, and other fatty acid derivatives in the feedstock. Thus, similar to the definition above, the average carbon number of the ketones generated by the conversion reaction can be at least about 1.5 times (for example, at least about 1.75 times or at least about 1.9 times) of a weighted average based on the average number of carbons in the side chains of triglycerides and the average chain length of the fatty amides, fatty acids, and/or fatty acid derivatives. The weighted average can be based on the relative amounts of glycerides, fatty amides (including substituted fatty amides), fatty acids, and/or fatty acid derivatives in the feedstock. Also in parallel to the definition above, the amount of ketones produced can be normalized by the combined weight percentage of glycerides, fatty amides, fatty acids, and fatty acid derivatives in the feedstock. Thus, the amount of ketones having a specified average carbon number can be at least about 40% (for example, at least about 60% or at least about 75%) of the combined weight of glycerides, free fatty acids, and fatty acid derivatives in the feedstock.

For a feedstock that includes a sufficient number of glycerides and/or fatty acids, it can be preferable to select a catalyst for catalyzing the conversion reaction that can remain relatively stable in the reaction environment if water is present. The conversion of glycerides and/or free fatty acids to ketones using a rare earth, alkali, and/or alkaline earth metal catalyst can result in some production of water, so catalysts that deteriorate in water may pose some difficulties in scaling up a process for commercial use. It is noted that the clay hydrotalcite can be effective for catalyzing the reactions described herein. However, hydrotalcite also appears to break down over time in the conditions for converting triglycerides to ketones. Without being bound by any particular theory, this may due to a phase change of the hydrotalcite alumina, such as a phase change induced by the presence of water under the conditions present in the conversion processing environment. Some phases of alumina, such as γ-alumina, are believed to be unstable in processing environments that include a sufficient amount of water under sufficiently severe pressure and/or temperature conditions, leading to phase changes for supports composed of such types of alumina that can result in a loss of activity over time. A further possible explanation is the leaching of magnesium from the hydrotalcite, resulting in formation of Mg soaps in combination with free fatty acids. An example of a catalyst suitable for coupling of glycerides, fatty amides, free fatty acids, and/or free fatty acid derivatives to ketones that is also resistant to degradation due to the presence of water includes, but is not limited to, lanthanum impregnated zirconia.

Hydroprocessing of Ketone-Containing Product

After forming ketones from fatty amides, fatty acids, and/or fatty acid derivatives (including glycerides), a second catalyst can be used to deoxygenate the ketones formed from exposure to the rare earth, alkali, and/or alkaline earth metal catalyst. It is noted that the ketone-containing product can also generally include nitriles and/or alkanes formed in the coupling reaction environment. In some aspects, the catalyst can be a hydrotreatment catalyst. Preferably, the second catalyst can be a catalyst such as a dewaxing catalyst also suitable for isomerizing the resulting deoxygenated molecules.

In some embodiments, an additional consideration in selecting a second catalyst can be that the catalyst should be relatively stable in the presence of water, due to the potential generation of water during conversion of fatty acids or triglycerides to ketones. This would allow for the ketone-containing product from the conversion step to be hydrotreated without the requirement for prior water removal. Further, it could allow for a step-skipping process where the fatty amide, fatty acids, and/or fatty acid derivatives (including glycerides) in the feed are directly converted to the heteroatom-free product over a stacked bed of catalyst.

In some embodiments, an intermediate separation can be used between the coupling reaction and the deoxygenation reaction in order to remove gas phase contaminants. The intermediate separation allows for removal of $NH_3$, $H_2O$, and CO that can form in the reaction environment for the coupling reaction. Other gas phase contaminants (such as $CO_2$) that have a lower tendency to cause catalyst poisoning or to otherwise inhibit catalyst activity can also be removed.

Suitable catalysts for performing deoxygenation and isomerization can include dewaxing catalysts, such as zeolites. Optionally, the dewaxing catalyst can be bound using a binder material that is also stable in the presence of water under effective deoxygenation and/or isomerization conditions. Such a binder material is referred to herein as a hydrothermally stable binder. Examples of suitable dewaxing catalysts can include zeolites that perform dewaxing primarily by isomerizing a hydrocarbon feedstock. Optionally, the dewaxing catalysts can be zeolites with a unidimensional pore structure. Suitable catalysts can include 10-member ring pore zeolites, such as EU-1, ZSM-35 (or ferrierite), ZSM-11, ZSM-57, NU-87, SAPO-11, ZSM-22, and the like, and combinations and intergrowths thereof. Preferred materials can comprise EU-2, EU-11, ZBM-30, ZSM-48, and/or ZSM-23, with materials comprising at least ZSM-48 being particularly preferred. Note that a zeolite having the ZSM-23 structure with a silica to alumina ratio from about 20:1 to about 40:1 can sometimes be referred to as SSZ-32. Additional or alternate molecular sieves that are isostructural with the above materials can include, but are not limited to, Theta-1, NU-10, EU-13, KZ-1, NU-23, and combinations and intergrowths thereof.

The catalysts can optionally but preferably also include a metal hydrogenation component. The metal hydrogenation component can typically include a Group VI and/or a Group VIII metal. In one preferred embodiment, the metal hydrogenation component can be a Group VIII noble metal, such as Pt and/or Pd. In an alternative preferred embodiment, the metal hydrogenation component can be a combination of a non-noble Group VIII metal with a Group VIB metal. Suitable combinations can include Ni, Co, and/or Fe with Mo and/or W, preferably Ni with Mo and/or W.

The metal hydrogenation component may be added to the catalyst in any convenient manner. One technique for adding the metal hydrogenation component is by incipient wetness. For example, after combining a zeolite and a hydrothermally stable binder, the combined zeolite and binder can be extruded into catalyst particles. These catalyst particles can then be exposed to a solution containing a suitable metal precursor. Additionally or alternately, metal can be added to the catalyst by ion exchange, where a metal precursor can be added to a mixture of zeolite (or zeolite and binder) prior to extrusion.

When a metal hydrogenation component is present, the amount of metal in the catalyst can be at least 0.1 wt % based on catalyst, for example at least 0.15 wt %, at least 0.2 wt %, at least 0.25 wt %, at least 0.3 wt %, or at least 0.5 wt %, based on the total weight of the catalyst. Additionally or alternately, the amount of metal in the catalyst can be 20 wt % or less based on catalyst, for example 10 wt % or less, 5 wt % or less, 2.5 wt % or less, or 1 wt % or less. For embodiments where the metal comprises Pt, Pd, another Group VIII noble metal, or a combination thereof, the amount of metal can be from 0.1 wt % to 5 wt %, for example, from 0.1 to 2 wt %, from 0.25 wt % to 1.8 wt %, or from 0.4 wt % to 1.5 wt %. For embodiments where the metal comprises a combination of a non-noble Group VIII metal with a Group VIB metal, the combined amount of metal can be from 0.5 wt % to 20 wt %, for example, from 1 wt % to 15 wt % or from 2.5 wt % to 10 wt %.

Preferably, the dewaxing catalysts used in processes according to the invention can exhibit a low ratio of silica to alumina. For example, for ZSM-48, the ratio of silica to alumina in the zeolite can be less than 200:1, for example, less than 110:1, less than 100:1, less than 90:1, or less than 80:1. In various embodiments, the ratio of silica to alumina can be from 30:1 to 200:1, for example, from 60:1 to 110:1 or from 70:1 to 100:1.

The dewaxing catalysts useful in processes according to the invention can also include a hydrothermally stable binder. Examples of suitable hydrothermally stable binders can include metal oxides such as titanium oxides, zirconium oxides, cerium oxides, and combinations thereof. By contrast, aluminum oxides are not believed to be typically suitable for use as binders in reaction environments that contain water. Preferably, the catalyst for deoxygenation and isomerization can include a binder material that can provide enhanced activity for deoxygenation, such as a titania binder. In environments where stability in the presence of water is not required, other suitable types of binders include alumina or silica-alumina binders.

Optionally, the dewaxing catalysts can be formulated using a relatively low surface area binder, a relatively low surface area binder representing a binder with a surface area of 100 m$^2$/g or less, for example, 80 m$^2$/g or less or 70 m$^2$/g or less. Additionally or alternately, the binder and/or the zeolite particle size can be selected to provide a catalyst with a desired ratio of micropore surface area to total surface area. In dewaxing catalysts used according to the invention, the micropore surface area corresponds to surface area from the unidimensional pores of zeolites in the dewaxing catalyst. The total surface corresponds to the micropore surface area plus the external surface area. Any binder used in the catalyst will typically not contribute much to the micropore surface area and typically will not significantly increase the total surface area of the catalyst. The external surface area represents the balance of the surface area of the total catalyst minus the micropore surface area. Both the binder and zeolite can contribute to the value of the external surface area. Preferably, the ratio of micropore surface area to total surface area for a dewaxing catalyst can be at least 25%.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can optionally be used to modify the extrusion flow properties of the zeolite and binder mixture.

In some aspects, a binder composed of two or more metal oxides can be used. In such aspects, the weight percentage of the low surface area binder can preferably be greater than the weight percentage of the higher surface area binder. Alternatively, if both metal oxides used for forming a mixed metal oxide binder have a sufficiently low surface area, the proportions of each metal oxide in the binder can be less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

Process conditions for catalytic dewaxing can include at least one of: a temperature from 200° C. to 450° C., for example from 270° C. to 400° C.; a hydrogen partial pressure from 1.7 MPag (250 psig) to 34.5 MPag (5000 psig), for example from 4.8 MPag (700 psig) to 20.7 MPag (3000 psig); a liquid hourly space velocity (LHSV) from 0.2 v/v/hr to 10 v/v/hr, for example from 0.5 v/v/hr to 3.0 v/v/hr; and a hydrogen circulation rate from 35.6 Nm$^3$/m$^3$ (200 scf/B) to 1780 Nm$^3$/m$^3$ (10,000 scf/B), for example from 178 Nm$^3$/m$^3$ (1000 scf/B) to 891 Nm$^3$/m$^3$ (5000 scf/B).

In some alternative aspects, other types of hydroprocessing catalysts and reactions can be used for removing any remaining heteroatoms from the conversion reaction effluent. For example, the effluent from the conversion reaction can be exposed to a hydrotreating catalyst under effective hydrodeoxygenation and/or effective hydrotreating conditions to remove heteroatoms.

Hydrotreatment is typically used to reduce the sulfur, nitrogen, and/or aromatic content of a feed. The catalysts used for hydrotreatment can include conventional hydrotreatment catalysts, such as those that comprise at least one Group VIII non-noble metal (Groups 8-10 of IUPAC periodic table), preferably Fe, Co, and/or Ni, such as Co and/or Ni; and at least one Group VI metal (Group 6 of IUPAC periodic table), preferably Mo and/or W. Such hydrotreatment catalysts optionally include transition metal sulfides that are impregnated or dispersed on a refractory support or carrier such as alumina and/or silica. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zirconia, titania, zirconia-alumina, silica-zirconia, silica-titania, and titania-alumina. Suitable aluminas are porous aluminas such as gamma or eta having average pore sizes from 50 Å to 200 Å, for example 75 Å to 150 Å; a surface area from 100 m$^2$/g to 300 m$^2$/g, for example from 150 m$^2$/g to 250 m$^2$/g; and a pore volume from 0.25 cm$^3$/g to 1.0 cm$^3$/g, for example 0.35 cm$^3$/g to 0.8 cm$^3$/g. In aspects where the amount of water present in the hydrotreatment environment is of concern, supports that do not contain alumina are preferred. More generally, any convenient size, shape, and/or pore size distribution for a catalyst suitable for hydrotreatment of a distillate (including lubricant base oil) boiling range feed in a conventional manner may be used. It is within the scope of the present invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst. Suitable metal catalysts include cobalt/molybdenum (~1-10% Co as oxide, ~10-40% Mo as oxide), nickel/molybdenum (~1-10% Ni as oxide, ~10-40% Co as oxide), or nickel/tungsten (~1-10% Ni as oxide, ~10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and can typically be removed from the treat gas before it is conducted to the reactor. The treat gas stream introduced into a reaction stage can preferably contain at least about 50 vol %, for example at least about 75 vol % hydrogen.

Hydrogen can be supplied at a rate of from about 100 SCF/B (standard cubic feet of hydrogen per barrel of feed) (about 17 $Nm^3/m^3$) to about 1500 SCF/B (about 253 $Nm^3/m^3$). Preferably, the hydrogen is provided in a range of from about 200 SCF/B (about 34 $Nm^3/m^3$) to about 1200 SCF/B (about 202 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., for example 315° C. to 425° C.; pressures of 250 psig (1.8 MPag) to 5000 psig (34.6 MPag), for example 300 psig (2.1 MPag) to 3000 psig (20.8 MPag); liquid hourly space velocities (LHSV) of 0.1 $hr^{-1}$ to 10 $hr^{-1}$; and hydrogen treat rates of 200 SCF/B (35.6 $Nm^3/m^3$) to 10000 SCF/B (1781 $Nm^3/m^3$), for example 500 SCF/B (89 $Nm^3/m^3$) to 10000 SCF/B (1781 $Nm^3/m^3$). Alternatively, hydrotreating conditions can be similar to the effective dewaxing conditions described above.

There are several alternatives for how to incorporate a dewaxing catalyst and/or hydrotreating catalysts into the reaction system. One option is to have the rare earth, alkali, and/or alkaline earth metal catalyst in a first catalyst bed or beds and the dewaxing (or other hydroprocessing) catalyst in a second bed or beds. An intermediate separation can be performed between the first bed(s) and second bed(s) to remove gas phase contaminants generated from reaction with the catalyst in the first catalyst bed(s). The intermediate separation allows $NH_3$ and $H_2O$ generated from reaction with the rare earth, alkali, and/or alkaline earth metal catalyst to be removed so that the dewaxing (or other hydroprocessing) catalyst is not exposed to these potential contaminants. The intermediate separation can be, for example, a gas-liquid separation.

One configuration can be to have a first reactor containing the rare earth, alkali, and/or alkaline earth metal catalyst. The effluent from the first reactor can then be passed into one or more gas-liquid separators. The liquid effluent from the gas-liquid separator(s) can then be passed into a second reactor containing the dewaxing or other hydroprocessing catalyst. In another configuration, a single reactor can be used. A feed for processing can first be exposed to one or more catalyst beds containing the rare earth, alkali, or alkaline earth metal catalyst. A gas-liquid separation can then be performed using a separator tray or another type of reactor internal for performing a gas-liquid separation. The liquid portion of the effluent from the first catalyst bed(s) can then be exposed to the dewaxing and/or hydroprocessing catalyst.

Another type of option can be to configure the rare earth, alkali, and/or alkaline earth metal catalyst and the dewaxing (or other hydroprocessing) catalyst as stacked beds. In this type of configuration, a reactor or reaction system can contain one or more initial beds of a rare earth, alkali, and/or alkaline earth metal catalyst for converting triglycerides to ketones. As described above, exposing a glyceride-containing feed to the one or more initial beds of rare earth, alkali, and/or alkaline earth metal catalyst can result in production of an effluent containing ketones based on the side chains in the glycerides. The effluent containing ketones can then be exposed to one or more beds of a dewaxing catalyst under effective dewaxing conditions and/or hydrotreatment catalyst under effective hydrotreatment conditions. This can result in deoxygenation of the ketone-containing effluent. Additionally, if the effluent is exposed to a dewaxing catalyst, the effective dewaxing conditions can introduce branches into (isomerize) the carbon chains of the ketones (or deoxygenated ketones). For fatty amides, fatty acids, or fatty acid derivatives with carbon chains that originally contain only carbon, hydrogen, and oxygen, the combination of forming ketones, deoxygenation, and isomerization can result in branched hydrocarbons containing one or more branches, such as methyl branches. Of course, if the carbon chains contain other types of heteroatoms, such as nitrogen and/or sulfur, other types of molecules may be generated.

For fatty amides (including substituted amides), fatty acids, and/or fatty acid derivatives with carbon chains containing between 12 and 20 carbon atoms (including glycerides with 12-20 carbon atom side chains), either the configuration with intermediate separation or the stacked bed configuration of rare earth, alkali, and/or alkaline earth metal catalyst and a dewaxing catalyst (or other hydroprocessing catalyst) can result in production of deoxygenated molecules that can advantageously boil in the lubricant boiling range as a primary product, with some production of deoxygenated molecules that can boil in the diesel boiling range. The lubricant boiling range molecules can correspond to ketones that were formed during conversion of the glycerides (and/or free fatty acids) in the feedstock. These ketones can subsequently be deoxygenated and isomerized. However, while the process of converting glycerides to fatty acids can typically occur at approximately 100% conversion, less than all of the side chains in the glycerides (and/or free fatty acids) may result in formation of ketones. Instead, at least a portion of the side chains from the glycerides can reach the dewaxing catalyst without combining with another side chain to form a lubricant boiling range molecule. These uncombined side chains can also be deoxygenated and isomerized by the dewaxing catalyst, resulting in diesel boiling range molecules. Thus, a stacked bed arrangement for the catalysts would be expected to generate a majority portion of lubricant boiling range molecules from a triglyceride feed and a minority portion of diesel boiling range molecules.

Still another configuration can be to combine both the rare earth/alkaline earth/alkali metal catalyst and a hydroprocessing catalyst in the same catalyst bed. In this type of configuration, both the rare earth/alkaline earth/alkali metal catalyst and the dewaxing catalyst (or other hydroprocessing catalyst) can be exposed to the initial feed. In this type of configuration, an increased amount of the initial glycerides (and/or free fatty acids) in the feed can be converted to diesel boiling range molecules. This is believed to be due to the ability of the dewaxing catalyst to deoxygenate the side chains of the glycerides (and/or of an intermediate product of the glycerides, such as fatty acids) before reaction to form a ketone can occur. It is noted that for some types of hydroprocessing catalysts, exposing a hydroprocessing catalyst to feeds containing amides and feeds corresponding to pyrolysis oils in this type of configuration may be less favorable, due to reduced activity of such catalysts in the presence of feeds containing nitrogen and/or having a high TAN value. Alternatively, catalysts designed for use in sour service environments may be compatible for use in this type of configuration.

By blending varying amounts of hydroprocessing catalyst (such as dewaxing catalyst) and rare earth/alkaline earth/alkali metal in a combined catalyst bed, the ratio of the amount of diesel boiling range molecules versus lubricant boiling range molecules can be adjusted. Thus, still another option can be to use "stacked" beds of various mixtures of the rare earth, alkali, and/or alkaline earth metal catalyst and the dewaxing catalyst. For example, a catalyst bed or beds containing ~80% of a rare earth, alkali, and/or alkaline earth metal catalyst and ~20% of a dewaxing catalyst can produce a larger amount of lubricant boiling range molecules than a catalyst bed or beds containing ~25% of the rare earth, alkali, and/or alkaline earth metal catalyst and ~75% of the dewaxing catalyst. An additional or alternate option for controlling the relative amounts of lubricant and diesel boiling range molecules can be to combine the stacked bed and mixed bed concepts. For example, an initial bed or an initial portion of a catalyst bed can correspond to a rare earth, alkali, and/or alkaline earth metal catalyst, a second bed or bed portion can correspond to a mixture of catalysts, and a third bed or portion can correspond to a dewaxing catalyst. Still other options for setting up various types of gradients in the amount of rare earth, alkali, and/or alkaline earth metal catalyst and dewaxing catalyst can additionally or alternately be used.

In order to provide a general way of characterizing the hydrocarbons resulting from conversion, deoxygenation, and isomerization of a feed containing fatty amides (including substituted amides), fatty acids, or fatty acid derivatives, the average carbon number in deoxygenated molecules derived from the fatty amides/acids/acid derivatives can be compared with the average number of carbons in the fatty amides/acids/acid derivatives in the feed. The average number of carbons in deoxygenated molecules derived from fatty amides/acids/acid derivatives in a feed can be at least about 1.5 times the average number of carbons in the carbon chains of the combined fatty amides/acids/acid derivatives in the original feed, for example at least about 1.75 time the average number of carbons or at least about 1.9 times the average number of carbons. If the weight of glycerides corresponds to more than about 10 wt % of the combined weight of fatty amides, fatty acids, and fatty acid derivatives (including glycerides), for example at least about 25 wt %, the average number of carbons in deoxygenated molecules can instead be compared with weighted average number of carbons in the combined fatty amides, fatty acids, and fatty acid derivatives (including glycerides) in the feedstock.

Due to the ability to form ketones starting with a glyceride feed, in some aspects it can be preferable for a feed including both glycerides and fatty amides to contain at least 10 wt % of glycerides, for example at least 25 wt % of glycerides. Optionally but preferably, a feed including both glycerides and free fatty acids and/or fatty acid derivatives can have a weight percentage of glycerides greater than the combined weight percentage of free fatty acids and fatty acid derivatives.

Because the feedstock may contain less than 100 wt % fatty amides, fatty acids, and fatty acid derivatives, the amount of deoxygenated molecules having a specified average carbon number can be normalized by the weight percentage of fatty amides, fatty acids, and fatty acid derivatives in the feed. In a situation where coupling to form ketones and deoxygenation/isomerization is performed sequentially using stacked beds, the weight of deoxygenated molecules in the product effluent having a specified average number of carbons can be at least 0.4 times the combined weight of fatty amides/acids/acid derivatives in the feedstock, for example at least 0.6 times the weight or at least 0.75 times the weight. As an example, consider a feed containing a combined ~50 wt % of fatty amides, fatty acids, and fatty acid derivatives with an average carbon number of 18 for the side chains. In such an example, the converted effluent can contain at least ~20 wt % of ketones (at least 0.4 times the weight of fatty amides/acids/acid derivatives) with an average carbon number of at least 27 (at least 1.5 times the average carbon number for the carbon chains). Additionally or alternately, such a converted effluent could contain at least ~30 wt % ketones (at least 0.6 times the weight of fatty amides/acids/acid derivatives) having an average carbon number of at least 27, and/or at least ~37.5 wt % ketones (at least 0.75 times the weight of triglycerides) having an average carbon number of at least 27.

As an alternative, mixed beds of conversion catalyst and deoxygenation/isomerization catalyst may be used. As noted above, in this configuration at least a portion of the fatty amide/acid/acid derivative carbon chains may contact the deoxygenation/isomerization catalyst prior to coupling to form a ketone. This can result in production of a higher percentage of diesel boiling range molecules in place of lubricant boiling range molecules. As a result, when mixed catalyst beds are used, the weight of deoxygenated molecules in the product effluent having a specified average number of carbons can be at least 0.1 times the combined weight of fatty amides, fatty acids, and fatty acid derivatives in the feedstock, for example at least 0.2 times the weight, at least 0.25 times the weight, or at least 0.5 times the weight.

Feedstocks

In some aspects, a feed containing amides, acids, or acid derivatives will be available from an external source. In other aspects, a suitable feed can be derived from biomass from a suitable biological source.

In the discussion herein, a feed derived from a biological source (i.e., a biocomponent feed(stock)) refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids can include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention can include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, rice bran oil, and the like, and combinations thereof.

Vegetable oils as referred to herein can also include processed vegetable oil material as a portion of the feedstock. Non-limiting examples of processed vegetable oil material include fatty acids and/or fatty acid alkyl esters. Alkyl esters can typically include $C_1$-$C_5$ alkyl esters. One or more of methyl, ethyl, and propyl esters can be preferred.

Examples of animal fats that can be used in accordance with the invention include, but are not limited to, beef fat (tallow), hog fat (lard), turkey fat, fish fat/oil, chicken fat, and the like, and combinations thereof. The animal fats can be obtained from any suitable source including restaurants and meat production facilities.

Animal fats as referred to herein also include processed animal fat material. Non-limiting examples of processed animal fat material include fatty acids and/or fatty acid alkyl esters. Alkyl esters can typically include $C_1$-$C_5$ alkyl esters. One or more of methyl, ethyl, and propyl esters can be preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt %, of lipids based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii.* Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Pichochlorum, Pseudoneochloris, Pseudostaurastrum, Platymonas, Pleurochrysis, Pleurococcus, Prototheca, Pseudochlorella, Pyramimonas, Pyrobotrys, Scenedesmus, Schizochlamydella, Skeletonema, Spyrogyra, Stichococcus, Tetrachlorella, Tetraselmis, Thalassiosira, Tribonema, Vaucheria, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

For a feed that starts with biomass, one or more initial processing steps may be performed to extract, convert, or otherwise increase the content of fatty amides, fatty acids, and/or fatty acid derivatives in the feedstock. One example of a process for extracting or converting a biomass feed to increase the content of fatty amides/acids/acid derivatives is hydrothermal processing. It is noted that fatty amides are typically not present within a feed derived from a biomass source. Instead, fatty amides are usually the result of processing (such as hydrothermal processing) of a biomass feed that also contains proteins. For example, without being bound by any particular theory, it is believed that fatty amides can be formed during hydrothermal treatment of a biomass feed that contains both lipids and proteins. The proteins are hydrolyzed under the hydrothermal treatment conditions to form amino acids. The amino acids are then further degraded to form ammonia and/or amines which dissolve in the water present in the hydrothermal treatment reaction environment. The aqueous ammonia and/or amines then reacts with free fatty acids to form fatty amides and substituted fatty amides. The substituted fatty amides represent products of amines with free fatty acids. A substituted fatty amide therefore has 1 or fewer hydrogens bound to the nitrogen atom in the amide. It is believed that the aqueous reaction environment of hydrothermal processing facilitates the reaction between the ammonia derived from amino acid generation and the free fatty acids to form fatty amides.

Regardless of the initial source, biocomponent feeds usable in the present invention can include any of those which comprise fatty amides (including substituted fatty amides), (free) fatty acids, fatty acid derivatives, or glycerides (a type of fatty acid derivative) such as triglycerides, diglycerides, monoglycerides. The fatty amides, fatty acids, and fatty acid derivatives typically contain aliphatic hydrocarbon chains in their structure having from 8 to 36 carbons, for example from 10 to 26 carbons or from 14 to 22 carbons. The fatty amide/acid/acid derivative constituents in a feed can be readily determined using Gas Chromatography (GC) analysis. In one embodiment, a majority (i.e., greater than 50%) of the fatty amide/acid/acid derivatives can correspond to molecules with carbon chain lengths of $C_{10}$ to $C_{26}$.

In various aspects, the production of ketones and corresponding deoxygenated products can be based on processing of fatty amides, (free) fatty acids, glycerides (such as monoacylglycerides, diacylglycerides, and/or triacylglycerides), and/or other fatty acid derivatives within the biocomponent feed. Thus, the presence of at least some fatty amides, fatty acids, glycerides, and/or other fatty acid derivatives within the biocomponent portion of a feed can be desirable. In some aspects, the presence of at least some glycerides in the biocomponent portion of the feed can be preferred, in order to take advantage of the ability to start with a glyceride-containing feed and to produce desirable diesel and/or lubricant boiling range molecules in a single process. The feed can include at least about 10 wt % of feed based on a biocomponent source(s), for example at least about 25 wt %. Preferably, the biocomponent portion of the feed can be at least about 50 wt %, for example at least about 75 wt %, at least about 90 wt %, or at least about 95 wt %. Such higher amounts of feed from a biocomponent source can provide an advantage based on the greater amount of renewable material. Additionally or alternately, the feed can be entirely a feed from a biocomponent source, or the feed can include about 99 wt % or less of a feed based on a biocomponent source, for example about 95 wt % or less, about 90 wt % or less, about 75 wt % or less, or about 50 wt % or less.

Higher amounts of feed from a biocomponent source can provide an advantage based on the greater amount of renewable material, as well as potentially including a greater amount of fatty amides/acids/acid derivatives. Feeds with lower amounts of biocomponent materials may have other processing advantages. Such advantages can include improved flow characteristics within a reaction system, as biocomponent feeds often have a relatively high viscosity compared to conventional diesel or lubricant feeds in a refinery. Additionally or alternately, deoxygenation of a biocomponent feed can typically generate a substantial amount of heat due to formation of highly favorable products from a free energy standpoint, such as $H_2O$ and $CO_2$. For a typical catalyst bed with a bed length of 25-30 feet (about 9-10 meters), it can be preferable to have a temperature increase across the bed of 100° F. (55° C.) or less. If deoxygenation of a biocomponent feed with a relatively high oxygen content is performed using a sufficiently reactive catalyst, an exotherm of greater than 100° F. across the catalyst bed can be generated. Blending a biocomponent feed with a portion that does not contain oxygen can reduce the exotherm generated across a catalyst bed used for performing deoxygenation.

The advantages of increased mineral feed content can be largely due to dilution of the biocomponent feed, as the processing conditions effective for deoxygenation of a biocomponent feed can have a low or minimal impact on a typical hydroprocessed mineral feed. Therefore, while the deoxygenation conditions can be effective for deoxygenation of biocomponent feeds at a variety of blend ratios with mineral feeds, it can be preferable to have at least about 75 wt % of the feed from a biocomponent source, for example at least about 90 wt % or at least about 95 wt %.

One option for increasing the biocomponent content of a feed while retaining some of the benefits of adding a feed with reduced oxygen content can be to use recycled product from processing of biocomponent feed as a diluent. A recycled product from processing a biocomponent feed is still derived from a biocomponent source, and therefore such a recycled product is counted as a feed portion from a biocomponent source. Thus, a feed containing ~60% biocomponent feed that has not been processed and ~40% of a recycled product from processing of the biocomponent feed would be considered as a feed that includes ~100% of feed from a biocomponent source. As an example, at least a portion of the product from processing of a biocomponent feed can be a diesel boiling range product. Such a recycled diesel boiling range product can advantageously be deoxygenated, and therefore incorporation of the recycled diesel boiling range product in the feed can advantageously reduce the exotherm generated during deoxygenation. Adding a recycled diesel boiling range product can also likely to improve the cold flow properties of a biocomponent feed. More generally, any convenient product from processing of a biocomponent feed can be recycled for blending with the biocomponent feed in order to improve the cold flow properties and/or to reduce the oxygen content of the input flow to a deoxygenation process. If a recycled product flow is added to the input to a deoxygenation process, the amount of recycled product can correspond to at least about 10 wt % of the feed to the deoxygenation process, for example at least about 25 wt % or at least about 40 wt %. Additionally or alternately, the amount of recycled product in a feed can be about 60 wt % or less, for example about 50 wt % or less, 40 wt % or less, or about 25 wt % or less.

While feed dilution can be used to control the exotherm generated across a catalyst bed used for deoxygenation, it is noted that some processing options can additionally or alternately impact the exotherm. One alternative can be to use a less reactive catalyst, so that a larger amount of catalyst can be needed at a given liquid hourly space velocity (LHSV) in order to deoxygenate a feed to a desired level. An additional or alternate option can be to reduce the amount of hydrogen provided for the deoxygenation process. Still another additional or alternate option could be to introduce additional features into a reactor to assist in cooling and/or transporting heat away from a deoxygenation catalyst bed. In combination with selecting an appropriate amount of product recycle and/or blending of another non-oxygenated feed, a desired combination of a flow characteristics and heat generation during deoxygenation can be achieved.

With regard to the content of fatty amides, fatty acids, and fatty acid derivatives (including glycerides) in a feedstock, the feedstock can include at least about 10 wt % of fatty amides/acids/acid derivatives, for example at least about 25 wt %, preferably at least about 40 wt %, at least about 60 wt %, or at least about 80 wt %. Additionally or alternately, the feed can be composed entirely of fatty amides/acids/acid derivatives, or the fatty amides/acids/acid derivative content of the feed can be about 99 wt % or less, for example about 95 wt % or less, about 90 wt % or less, about 75 wt % or less, or about 50 wt % or less.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Additionally, for a bio oil feed derived from extraction of bio oil from an algae source by hydrothermal processing, the amount of nitrogen in the feed can depend on the severity of the hydrothermal processing reaction. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, about 30 wppm or less, about 20 wppm or less, about 15 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 14 wt % oxygen, for example up to about 12 wt % or up to about 10 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

A mineral feedstock refers to a conventional (e.g., non-biocomponent) feedstock, typically derived from crude oil and that has optionally been subjected to one or more separation and/or other refining processes. When mineral feedstock is present, in one preferred embodiment, the mineral feedstock can be a petroleum feedstock boiling in the diesel range or above. Examples of suitable mineral feedstocks can include, but are not limited to, virgin distillates, hydrotreated virgin distillates, kerosene, diesel boiling range feeds (such as hydrotreated diesel boiling range feeds), light cycle oils, atmospheric gas oils, and the like, and combinations thereof.

Mineral feedstocks for blending with a biocomponent feedstock can be relatively free of nitrogen (such as a previously hydrotreated feedstock) or can have a nitrogen content from about 1 wppm to about 2000 wppm nitrogen, for example from about 50 wppm to about 1500 wppm or from about 75 to about 1000 wppm. In some embodiments, when the mineral feedstock is present, it can have a sulfur content from about 1 wppm to about 10000 wppm sulfur, for example from about 10 wppm to about 5000 wppm or from about 100 wppm to about 2500 wppm.

When present, a mineral feedstock for blending with a biocomponent feedstock can preferably be a mineral feedstock with a relatively low sulfur content, such as a hydrotreated mineral feedstock. Using a mineral feedstock for blending that contains a sufficiently low sulfur content can allow a resulting product to meet a desired sulfur specification without requiring a subsequent hydrotreatment under conditions that saturate olefins. Such preferred feedstocks can be relatively free of sulfur, or can have a sulfur content from about 1 wppm to about 500 wppm, such as from about 10 wppm to about 200 wppm of sulfur or from about 20 wppm to about 100 wppm of sulfur. Additionally or alternately, the combined (biocomponent plus mineral) feedstock can have a sulfur content of at least about 5 wppm, for example at least about 10 wppm, at least about 25 wppm, or at least about 100 wppm. Further additionally or alternately, the combined feedstock can have a sulfur content of about 500 wppm or less, about 100 wppm or less, or about 50 wppm or less. Still further additionally or alternately, the nitrogen content of the combined feedstock can be about 1000 wppm or less, for example about 500 wppm or less, about 100 wppm or less, about 50 wppm or less, about 30 wppm or less, about 20 wppm or less, or about 10 wppm or less.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of ~80 wt % mineral feed and ~20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

The boiling range for biocomponent feedstreams suitable for use according to the invention can vary depending on the nature of the biocomponent source. Biocomponent feedstreams with final boiling points up to about 1200° F. (650° C.) may be suitable for use, as the triglycerides within a biocomponent feedstream will have a higher boiling point than the boiling point of the individual chains attached to the glycerol backbone. Mineral feedstreams suitable for use as a blending component tend to boil within the range of about 215° F. (about 102° C.) to about 800° F. (about 427° C.). Preferably, a mineral feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, a mineral feedstream has a final boiling point of about 800° F. (about 427° C.) or less, or about 750° F. (about 399° C.) or less. Additionally or alternately, a feedstock can be characterized by the boiling point required to boil a specified percentage of the feed. For example, the temperature required to boil at least 5 wt % of a feed is referred to as a "T5" boiling point. A suitable mineral (petroleum) feedstock can have a T5 boiling point of at least about 230° F. (about 110° C.), for example at least about 250° F. (about 121° C.) or at least about 275° F. (about 135° C.). Further additionally or alternately, the mineral (petroleum) feedstock can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

With regard to product effluents, deoxygenated effluents, or converted effluents, diesel boiling range streams are defined herein as streams with a T95 boiling point of about 400° C. or less, while lubricant boiling range streams are defined herein as streams with a T5 boiling point above about 400° C.

Hydrothermal Processing of Biomass

Figure 5:
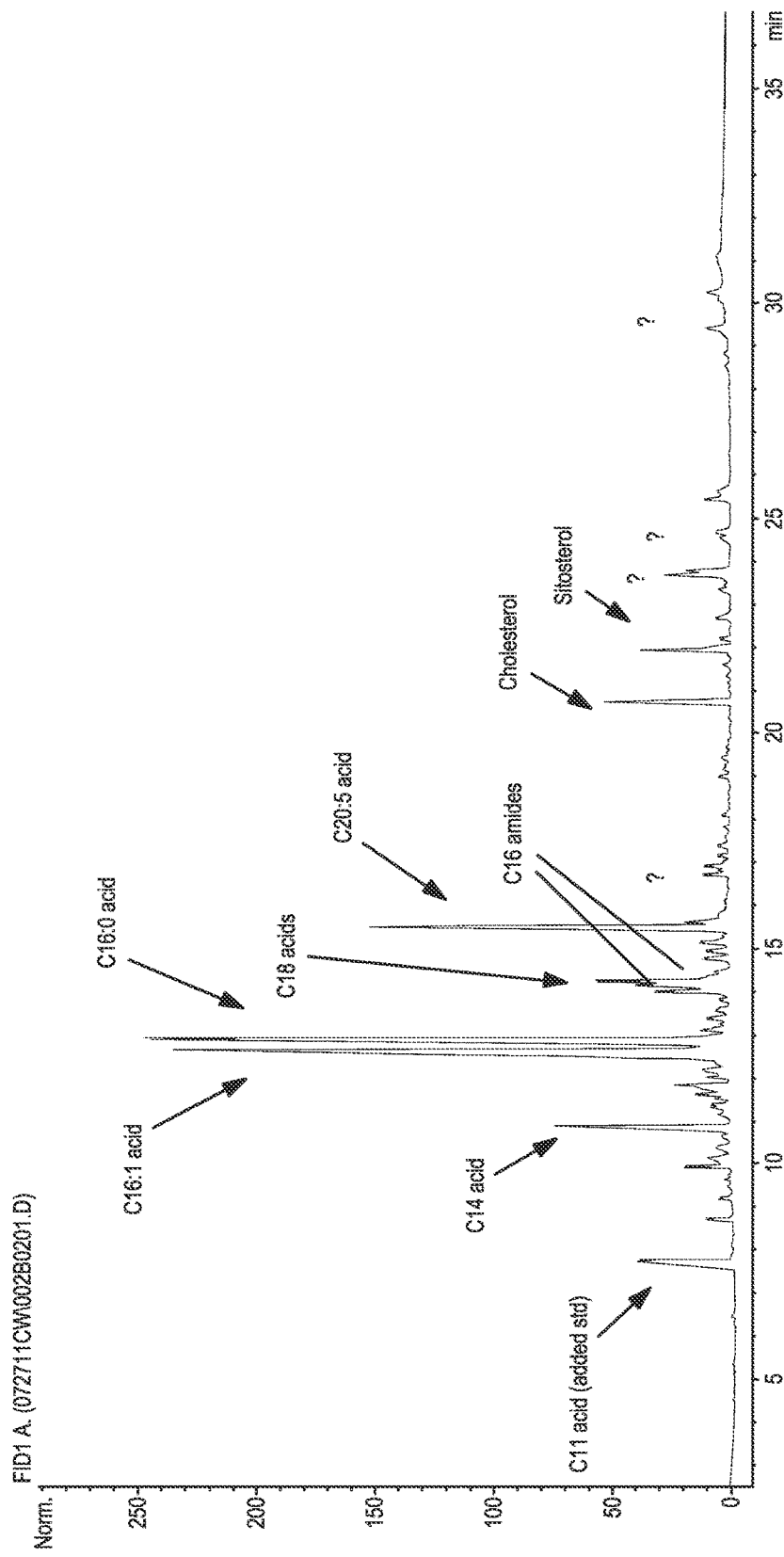
FIG. 5 shows results from hydrothermally processing a biomass feed to generate an amide-containing feed.

As noted above, hydrothermal processing of biomass is one method for creating a suitable feed containing fatty amides, acids, and/or acid derivatives (including glycerides). FIG. 5 shows an example of a feedstock generated by hydrothermally processing an algae feed at ~300° C., which was sufficiently severe to result in formation of amides. As shown in FIG. 5, hydrothermal processing on the algae feed resulted in production of a potentially diesel boiling range feedstock (based on carbon chain length, without considering heteroatoms) that includes a variety of fatty acids and fatty amides. This type of potential diesel boiling range feedstock is suitable for processing over catalyst systems as described herein for conversion of the fatty amides, fatty acids, and/or fatty acid derivatives and subsequent deoxygenation and optionally isomerization.

The fatty amide (or other amide) content of a bio oil generated by extraction of bio oil from algae via hydrothermal processing can be at least about 5 wt % of a bio oil feed, such as at least about 10 wt % or at least about 15 wt %. The amount of amide content in the bio oil can depend on the nature of the algae and the severity of the hydrothermal processing. The nitrogen content of a bio oil derived from hydrothermal processing of an algae-based feed can be at least about 1 wt %, such as at least about 1.5 wt % or at least about 2 wt % or at least about 3 wt %.

In various aspects, hydrothermal processing to generate such a feedstock can be performed in a batch, semi-batch, and/or continuous type processing environment(s). Regardless of whether the reaction takes place in a batch, semi-batch, or continuous reaction system, any system region where the biomass is treated under hydrothermal treatment conditions can be referred to as the reaction zone. The reaction zone can correspond to a reactor for a batch or semi-batch environment and/or to a reactor, conduit, or other location for hydrothermal treatment in a continuous reaction system.

In embodiments involving a batch reactor, the reactor can be any type of batch reactor suitable for handling the processing conditions. Due to the potential presence of water at supercritical conditions, stainless steel can be a suitable non-reactive material for the reactor walls. Other materials and/or coatings for the reactor surfaces can be used that are compatible with the reaction conditions described herein. Examples of suitable reactors can include, but are not limited to, autoclaves, stirred tanks, plough mixers, and the like, and combinations thereof. Alternately, a bubble column could be used. One possible advantage for batch or semi-batch type processing can occur for algae feeds that have relatively poor flow characteristics. For example, at an algae concentration relative to water of about 20 wt % (i.e., about 4 parts water to 1 part algae by weight), the resulting mixture can have the consistency of a paste. Such a paste could be difficult to move, e.g., using pumps in a continuous flow type reactor.

In one aspect, a batch reactor can be used for hydrothermal processing of an algae feed. A portion of algae feed mixed with water can be introduced into the reactor, which can then be purged (if necessary), e.g., to remove any oxygen containing gases. Optionally, a partial pressure of an inert gas and/or a reducing gas can then be introduced into the reactor. Examples of suitable reducing gases can include hydrogen, while suitable inert gases can include nitrogen. Additional or alternate examples of suitable reducing gases can include any gas that does not add molecular oxygen to the reaction atmosphere, whether prior to the start of the reaction or from dissociation forming oxygen during the hydrothermal processing. The partial pressure of additional gas introduced into the reactor, when present, can be at least about 1 bar (about 0.1 MPa), for example at least about 25 bar (about 2.5 MPa), at least about 40 bar (about 4.0 MPa), or at least about 50 bar (about 5.0 MPa). Additionally or alternately, the partial pressure of gas introduced into the reactor, when present, can be about 100 bar (about 10 MPa) or less, for example about 75 bar (about 7.5 MPa) or less or about 50 bar (about 5.0 MPa) or less. Note that introducing a reducing gas can correspond to at least partially dissolving a reducing gas in the water (e.g., saturating the water) for the hydrothermal treatment.

After introducing the algae, water, an optional catalyst, and any additional reducing and/or inert gases, the batch reactor can be sealed. The temperature of the reactor can then be raised to at least about 50° C., for example at least about 80° C., at least about 100° C., at least about 150° C., at least about 200° C., at least about 250° C., at least about 275° C., or at least about 300° C. Additionally or alternately, the temperature of the reactor can be raised to about 500° C. or less, for example about 400° C. or less, about 380° C. or less, about 350° C. or less, about 300° C. or less, or about 275° C. or less. Further additionally or alternately, the pressure in the reactor can be at least about 1 barg (about 0.1 MPag), for example at least about 4.5 barg (about 450 kPag), at least about 25 barg (about 2.5 MPag), at least about 40 barg (about 4.0 MPag), at least about 50 barg (about 5.0 MPag), or at least about 100 barg (about 10 MPag). Additionally or alternately, the partial pressure of gas introduced into the reactor, when present, can be about 300 barg (about 30 MPag) or less, for example about 250 barg (about 25 MPag) or less, about 225 barg (about 22.5 MPag) or less, or about 200 barg (about 20 MPag) or less.

In embodiments where hydrothermal processing is performed under conditions having sufficient severity to generate fatty amides within the resulting hydrothermal treatment products, the temperature in the reactor for hydrothermal processing can be at least about 250° C., such as at least about 275° C. or at least about 300° C. Modifying the pressure in the hydrothermal processing environment does not appear to have a strong impact on the formation of fatty amides in the resulting hydrothermal treatment products.

In some embodiments, the combination of pressure and temperature within the reactor can be selected so that the water in the reactor substantially does not undergo a phase change (e.g., completely does not undergo a phase change). In a phase diagram for water, the critical point is located at a temperature of about 374° C. and a pressure of about 22 MPa. At temperature and pressure combinations beyond this point in the phase diagram, water does not experience a phase transition between a liquid phase and a gaseous phase. Instead, beyond the critical point, water behaves as a single fluid phase. Thus, in some embodiments, the combination of pressure and temperature can be selected so that the liquid water in the reactor remains the stable phase until conditions beyond the critical point are achieved. One way of satisfying this condition can be to select reaction temperatures and pressures that are less than the critical point and thus that do not lead to a phase transition. Note that in some embodiments, a partial pressure of additional gas can be introduced into the reactor (in which case, some minimal amount of water may become vapor, but this situation is contemplated in the invention not to be a "substantial" phase change). If the partial pressure of additional gas is greater than about 22 MPa, then the pressure is already beyond the critical point for water and substantially no phase transition is possible. Note also that, in a closed reactor, e.g., which can have a partial pressure of another gas, substantial phase transitions of water are not likely to occur, so long as the volume of liquid water is sufficient relative to the volume of the reactor.

Additionally or alternately, the pressure within a reactor can be set by selecting a temperature for the water. In some embodiments, the reactor can be sealed or closed after introduction of water and any additional gases, if present. A partial pressure of water vapor should develop in the reactor to correspond to the temperature of the water in the reactor. As the temperature of the reactor increases, a corresponding higher partial pressure of water should develop in the reactor. The hydrothermal processing can be performed at a pressure that represents the combination of the partial pressure of water at the reaction temperature and the partial pressure of any additional inert and/or reducing gases, as well as the partial pressure of any gases generated or evolved during processing. Examples of water partial pressures at various temperatures can include about 0.01 MPa at about 50° C.; about 0.05 MPa at about 80° C.; about 0.1 MPa at about 100° C.; about 0.5 MPa at about 150° C.; about 1.6 MPa at about 200° C.; about 4.0 MPa at about 250° C.; about 5.9 MPa at about 275° C.; about 8.6 MPa at about 300° C.; about 16.5 MPa at about 350° C.; and about 22.1 MPa at about 374° C. Because about 22.1 MPa and about 374° C. corresponds to the critical point in the phase diagram for water, it is not meaningful to refer to the partial pressure of "water vapor" in a reactor at temperatures beyond that point.

Optionally, hydrothermal processing can be performed in the presence of a catalyst. Types of catalysts include heterogeneous catalysts and homogeneous catalysts. Heterogeneous catalysts are catalysts that are present as distinct catalyst particles in the reaction environment. Heterogeneous catalysts often include a catalytic material on a support that is stable in the hydrothermal processing environment. Heterogeneous catalysts include catalysts where either the catalyst itself or a precursor for the catalyst is soluble in some phase that is present in the hydrothermal processing environment.

One catalyst option can be to use a supported catalyst including a noble metal (e.g., Pt, Pd, Rh, Ru, Ir, or a combination thereof). Additionally or alternately, the support for the catalyst can be a hydrothermally stable support. Examples of suitable supports can include, but are not limited to, refractory oxides such as titania and/or zirconia; silica; activated carbon; carbon on which is deposited one or more metals selected from titanium, zirconium, vanadium, molybdenum, manganese, and cerium; magnesium oxides; hydrotalcites; other various types of clays; and combinations thereof, such as a mixture of two or more of titania, zirconia, and silica. Additionally or alternately, the support material can be substantially free of alumina. As used herein, "substantially free" of alumina should be understood to mean less than 1 wt % alumina, preferably less than 0.1 wt % alumina, for example less than 0.01 wt % of alumina, completely no added alumina, or completely no alumina.

Another catalyst option can be to use a basic metal or mixed metal oxide with or without a noble metal. Examples of such catalysts without a noble metal can include, but are not limited to, magnesium oxide, hydrotalcites, potassium supported on titania and/or zirconia, and combinations thereof.

Still another catalyst option can be to use hydroprocessing type metals supported on a suitable support. Examples of hydroprocessing type metals can include, but are not limited to, a combination of a Group VIII metal (such as Co and/or Ni) with a Group VIB metal (such as Mo and/or W). Combinations of three or more Group VIII and/or Group VI metals can additionally or alternately be used (e.g., NiMoW, CoNiMo, CoMoW, and the like). Suitable support materials include those identified hereinabove.

In some embodiments, the catalyst metals can be present on the catalyst in the form of an oxide or a sulfide. Additionally or alternately, catalyst metals can be present in a metallic state. Further additionally or alternately, catalyst metals can be present on a support in any convenient form. Examples can include metal salts such as metal acetates, metal carbonates, or other organometallic forms.

Relative to the amount of algae, the amount of catalyst in the reactor (reaction zone) can be at least about 0.05 wt %, for example at least about 0.1 wt %, at least about 1 wt %, at least about 2.5 wt %, or at least about 5 wt %. Additionally or alternately, the amount of catalyst in the reactor (reaction zone) can be about 20 wt % or less relative to the amount of algae, for example about 15 wt % or less or about 10 wt % or less.

The amount of metal supported on the catalyst can be varied. Relative to the weight of the catalyst, the amount of noble metal supported on the catalyst, when present, can be at least about 0.1 wt %, for example at least about 0.5 wt %, at least about 0.6 wt %, at least about 0.75 wt %, or at least about 1.0 wt %, based on the total catalyst weight. Additionally or alternately, the amount of noble metal supported on the catalyst, when present, can be about 1.5 wt % or less, for example about 1.0 wt % or less, about 0.75 wt % or less, or about 0.6 wt % or less, based on the total catalyst weight. More generally, the amount of metal(s), individually or in mixtures, on the catalyst support can be at least about 0.1 wt %, for example at least about 0.25 wt %, at least about 0.5 wt %, at least about 0.6 wt %, at least about 0.75 wt %, at least about 1 wt %, at least about 2.5 wt %, or at least about 5 wt %, based on the total catalyst weight. Additionally or alternately, the amount of metal(s), individually or in mixtures, on the catalyst support can be about 35 wt % or less, for example about 20 wt % or less, about 15 wt % or less, about 10 wt % or less, or about 5 wt % or less, based on the total catalyst weight.

Additionally or alternately, the particle size for the catalyst particles can be varied, e.g., selected to facilitate separation of the catalyst particles from other solids. In such an embodiment, the catalyst particles can have an average particle size of at least about 1000 µm, for example at least about 1500 µm or at least about 2000 µm. To achieve a desired catalyst particle size, catalysts can optionally be formulated to include a hydrothermally stable binder material, in addition to the support material and any active metals, if present. Suitable hydrothermally stable binder materials can be similar to materials used as a support material and/or can include, but are not necessarily limited to, an oxide of one or more metals selected from silicon, titanium, zirconium, vanadium, molybdenum, manganese, and cerium. For a supported catalyst that is formulated with a binder, the support material can function as a binder, or a different material can be used as a binder.

Another option is to use a catalyst or catalyst precursor that is soluble in the hydrothermal reaction environment. The soluble catalyst (or catalyst precursor) can be soluble in water or in another solvent introduced into the hydrothermal reaction environment. Examples of solvents can include but are not limited to alcohols, acids, hydrocarbons, or other oils. Additionally or alternately, the solvent can correspond to a product that is generated by the hydrothermal treatment process. Examples of suitable catalysts or catalyst precursors can include, but are not limited to, transition metal salts such as metal acetates, metal carbonates, metal acetyl acetonates, or combinations thereof. Examples of suitable metals for such metal salts can include, but are not limited to, Cr, V, Mo, Ni, Cu, Fe, Co, Mn, and a combination thereof. Additionally or alternately, a suitable metal can include a Group VIB metal or a Group VIII metal, or a combination of one or more Group VIB metals and one or more Group VIII non-noble metals.

Additionally or alternately, a biocompatible material can be selected as the catalyst. Examples of biocompatible catalyst materials can include, but are not limited to, metals selected from Fe, Zn, Mn, Mo, Cu, and combinations thereof. These biocompatible catalyst materials can be recycled either as a nutrient feed for biomass growth or as an input into the hydrothermal treatment reaction.

Relative to the amount of algae, the amount of metal in a soluble catalyst or catalyst precursor in the reactor (reaction zone) can be at least about 0.01 wt % (100 wppm), for example at least about 0.05 wt %, at least about 0.1 wt %, at least about 0.25 wt %, or at least about 0.5 wt %. Additionally or alternately, the amount of catalyst in the reactor (reaction zone) can be about 5.0 wt % or less relative to the amount of algae, for example about 3.0 wt % or less, about 2.0 wt % or less, about 1.0 wt % or less, about 0.5 wt % or less, or about 0.25 wt % or less.

In some aspects, the hydrothermal processing can be performed in a continuous flow type reactor. An example of a continuous flow type reactor can be a pipe or other conduit that can be heated to raise the temperature of the feed in the conduit to the desired hydrothermal processing temperature. For example, a conduit passing through a furnace could be used, and/or a conduit surrounded by steam. The conduit can have any convenient shape for passing through the heating zone. For example, a conduit having the shape of a spiral can be used to increase the size of the portion of the conduit within the heating zone.

It is noted that the amount of water needed in order to perform hydrothermal processing may not be sufficient to provide the type of flow characteristics desired for a continuous flow environment. In a continuous flow processing environment, one option for improving the fluid flow characteristics of the algae can be to increase the water content of the algae feed. However, increasing the water content can also result in a corresponding decrease in the yield per volume of the reaction system, due to the reduction in the amount of algae in the feed.

Other types of continuous flow reactors can potentially be used for hydrothermal treatment of an algae feed. For example, if a heterogeneous catalyst is used, the hydrothermal treatment can be performed in a fixed bed reactor, a moving bed, an ebullating bed reactor, or the like. If a fixed bed reactor is used, one concern could be fouling of the catalyst bed, e.g., due to solids present in the biomass or algae feed. Fouling of a catalyst bed can result in a higher than expected pressure drop across a catalyst bed, due to restrictions in flow of feed through the bed. Fixed bed reactors can often handle feeds with particle sizes up to about 150 µm without significant fouling issues. Nevertheless, any fouling of a catalyst bed can be somewhat mitigated, e.g., by having bypass tubes to control the pressure drop across the catalyst bed. Unfortunately, although individual algae cells have small diameters, relative to 150 µm, hydrothermally treated algae can have an increased tendency to agglomerate. As a result, 5% or more of the algae based solids resulting from hydrothermal treatment of an algae feed can be in the form of agglomerated particles with a particle size greater than 150 µm. Nevertheless, in some embodiments, a fixed bed reactor may be used, particularly when agglomerative behavior of the product algae solids can be mitigated, e.g., by using a sufficient space velocity and/or through other means.

As an alternative to a fixed bed reactor, an ebullating bed reactor can be used for hydrothermal processing. In a conventional ebullating bed reactor, both the feedstock (water and algae) and a treat gas (hydrogen-containing reducing gas) can be introduced into the reactor from the bottom of the reactor. In such reactors, a recycled feed containing a portion of the reactor effluent can also be introduced into the bottom of the reactor. These feed flows can travel up into the reactor and pass through a catalyst support grid designed to prevent catalyst from entering the areas at the bottom of the reactor where the feed pumps are located. The catalyst in such ebullating bed reactors is typically located above the catalyst support grid.

When the feedstock (and optionally additional gas) flow(s) reach the catalyst bed, the bed generally becomes fluidized, leading to expansion of the bed as well as mixing within the bed. The feed (and hydrogen) can react within the bed to form products, including liquid products, solid products, and gaseous products. The flow in a conventional ebullating bed reactor can continue upward until an effluent is drawn off at the top. This effluent can be a combination of desired products, unreacted hydrogen (when present), and byproduct gases, including contaminant gases such as $H_2S$ or $NH_3$ that may have formed during the reaction. In preferred embodiments, a portion of the liquid effluent can be recycled, e.g., to the bottom of the reactor. If desired, the gases can be separated from the liquid portion of the effluent.

Tables 1 and 2 show examples of hydrothermal processing of five different types of algae under processing conditions with increasing severity based on increased processing temperature. Tables 1 and 2 show that the yield of hydrocarbon-like molecules (i.e., bio oil) can be increased as the hydrothermal processing temperature is increased. The composition of the extracted bio oil in terms of the carbon, hydrogen, and nitrogen content is also shown.

TABLE 1

Nitrogen Content of Extracted Bio Oil (Algae Samples 1-3)

| | Pichochlorum | | | Tetraselmis | | | Chlorella | | |
|---|---|---|---|---|---|---|---|---|---|
| Hydrothermal Recovery Temperature (° C.) | 200 | 250 | 300 | 200 | 250 | 300 | 200 | 250 | 300 |
| Yield (dry wt %) | 5.3 | 8.4 | 16.2 | 15.7 | 19.5 | 33.8 | 23.6 | 31.9 | 34.3 |
| Elemental Analysis | | | | | | | | | |
| CARBON (wt %) | 73.84 | 71.1 | 76.24 | 75.48 | 74.16 | 75.22 | 74.22 | 74.53 | 75.77 |
| HYDROGEN (wt %) | 10.25 | 9.4 | 9 | 10.81 | 10.38 | 10.06 | 11.15 | 10.49 | 10.61 |
| NITROGEN (wt %) | 1.01 | 3.4 | 4.33 | 0.44 | 1.28 | 1.87 | 0.35 | 1.49 | 2.23 |

TABLE 2

Nitrogen Content of Extracted Bio Oil (Algae Samples 4-5)

| | Nannochloris | | | Nannochloropsis | | |
|---|---|---|---|---|---|---|
| Hydrothermal Recovery Temp. (° C.) | 200 | 250 | 300 | 200 | 250 | 300 |
| Yield (dry wt %) | 1.8 | 9.4 | 18.4 | 23.0 | 34.9 | 52.0 |
| Elemental Analysis | | | | | | |
| CARBON (wt %) | 70.15 | 74.11 | 75.68 | 75.54 | 76.09 | 75.78 |
| HYDROGEN (wt %) | 9.28 | 9.47 | 9.06 | 11.30 | 11.20 | 10.65 |
| NITROGEN (wt %) | 2.54 | 3.48 | 4.66 | 0.46 | 1.37 | 2.65 |

As shown in Tables 1 and 2, at ~200° C. a lower yield of bio oil is generated, but the nitrogen content of the extracted oil is the lowest for each of the five types of algae. This demonstrates that at ~200° C., only a limited amount of conversion of proteins from the algae cells are being converted and/or extracted as part of the bio oil product. However, even at ~200° C., the nitrogen content for some of the resulting bio oil products is greater than 1.0 wt %. As the processing temperature increases, the nitrogen content of the extracted bio oil increases, with the highest nitrogen contents corresponding to hydrothermal processing at ~300° C. This increased nitrogen content as the temperature of hydrothermal processing increases is believed to be due to conversion of proteins during more efficient extraction of bio oil from the cells. Depending on the type of algae, processing at either ~250° C. or ~300° C. can be sufficient to generate an extracted bio oil product from algae with a nitrogen content of at least about 1.5 wt %, such as at least about 2 wt % or at least about 3 wt %.

Configurations for Formation of Distillate Products

Figure 6:
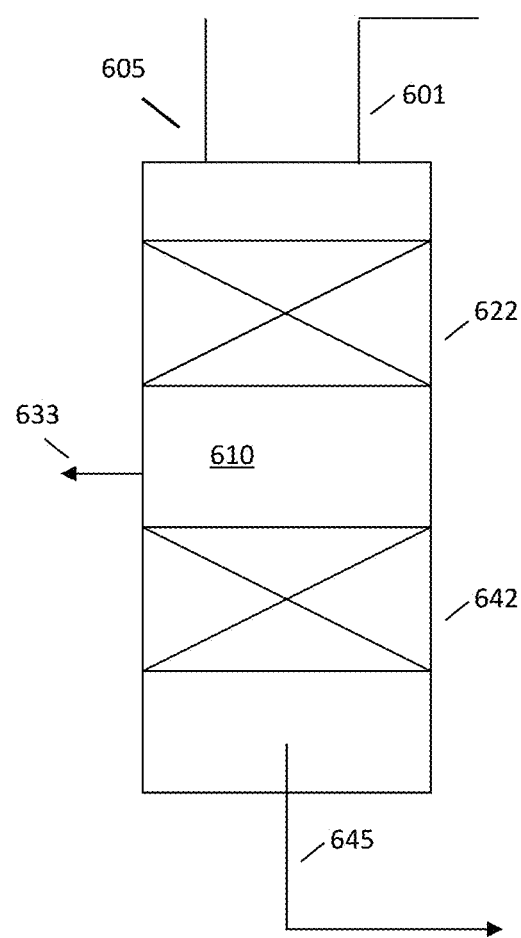
FIG. 6 schematically shows a reaction system suitable for performing a process according to an aspect of the invention.

FIG. 6 shows an example of a reactor suitable for processing a feed containing fatty amides, fatty acids, and/or fatty acid derivatives. In FIG. 6, reactor 610 is shown as containing reaction zones 622 and 642. Each reaction zone can correspond to one or more catalyst beds. Alternatively, one or more reactors may be used in a cascade configuration, and any convenient number of reaction zones may be used within a reactor.

In stacked bed configuration, reaction zone 622 can contain one or more catalyst beds of a rare earth, alkali, and/or alkaline earth metal catalyst. A feedstock 605 containing fatty amides, fatty acids, and/or fatty acid derivatives is introduced into reactor 610 so that the feedstock is exposed to the catalyst in the catalyst beds in reaction zone 622 prior to being exposed to the catalyst in reaction zone 642. In FIG. 6, hydrogen treat gas 601 is shown as entering reactor 610 in a co-current manner relative to the flow of the feedstock 605. Alternatively, hydrogen treat gas can be introduced into reactor 610 in other convenient manners, such as introducing the hydrogen treat gas to flow counter-current relative to feedstock 605.

After passing through reaction zone 622, the effluent is exposed to the catalyst in the one or more catalyst beds in reaction zone 642. Depending on the configuration, reaction zone 642 is an optional reaction zone. For example, in a configuration where only mixed beds of catalyst are used, only a single reaction zone 622 may be needed. The effluent from reaction zone 642 (or optionally reaction zone 622) then exits the reactor as a product effluent flow 645.

In some embodiments, an intermediate separation can be performed between reaction zone 622 and reaction zone 642. In such embodiments, gas phase contaminants can be withdrawn from the reactor as a gas phase stream 633. The remaining liquid portion of the effluent is then passed into reaction zone 642.

In one type of stacked bed configuration, the one or more catalyst beds in reaction zone 622 correspond to a rare earth, alkali, and/or alkaline earth metal catalyst, while the one or more catalyst beds in reaction zone 642 correspond to a dewaxing catalyst. In another type of stacked bed configuration, one or both of reaction zones 622 and 642 can contain mixed beds of rare earth, alkali, and/or alkaline earth metal catalyst and dewaxing catalyst. In this type of configuration, the volume percentage of the dewaxing catalyst is greater in the catalyst beds in reaction zone 642 as compared to the volume percentage of dewaxing catalyst in the catalyst beds in reaction zone 622. In various stacked bed configurations, the effluent from reaction zone 622 can be passed into reaction zone 642 without intermediate separation. In such a configuration, any gas phase products generated during processing in reaction zone 622, such as water vapor generated by coupling reactions for the formation of ketones, will be passed into reaction zone 642 along with the liquid effluent.

Still another option is to have a uniform mixture of dewaxing catalyst and rare earth, alkali, and/or alkaline earth metal catalyst within the reaction zones in the reactor. In this type of configuration, reaction zone 642 is optional, as the same or similar conditions are present throughout the reactor. Thus, all catalyst beds within the reactor can alternatively be thought of as being in reaction zone 622.

ADDITIONAL EMBODIMENTS

The invention can additionally or alternatively include one or more of the following embodiments.

Embodiment 1

A method for processing an amide-containing feedstock, comprising: exposing a bio oil containing feedstock containing at least about 1.0 wt % nitrogen and at least about 5 wt % fatty amides to a first catalyst comprising at least about 5 wt % of a rare earth metal salt, an alkali metal salt, an alkaline earth metal salt, or a combination thereof under effective deoxygenation conditions to form an effluent containing ketones; separating the effluent to form at least a gas phase effluent and a liquid effluent containing ketones; and exposing at least a portion of the liquid effluent to a hydroprocessing catalyst under effective hydroprocessing conditions to form a deoxygenated effluent, wherein an average carbon number of the ketones in the liquid effluent is greater than 1.5 times an average carbon number for the combined fatty amides, fatty acids, and fatty acid derivatives.

Embodiment 2

A method for processing an amide-containing feedstock, comprising: exposing a bio oil containing feedstock containing at least at least 5 wt % fatty amides to a catalyst comprising at least about 5 wt % of a rare earth metal salt, an alkali metal salt, an alkaline earth metal salt, or a combination thereof in the presence of hydrogen under effective deoxygenation conditions to form an effluent containing ketones, the weight percentage of ketones in the effluent being at least about 50% of the combined weight percentage of fatty amides, fatty acids, and fatty acid derivatives in the feedstock; and exposing, without intermediate separation, at least a portion of the effluent containing ketones to a hydroprocessing catalyst under effective hydroprocessing conditions to form a deoxygenated effluent, wherein an average carbon number of the ketones in the effluent is greater than 1.5 times an average carbon number for the combined fatty amides, fatty acids, and fatty acid derivatives.

Embodiment 3

The method of any of the above embodiments, wherein the weight percentage of ketones in the effluent being at least about 50% of the combined weight percentage of fatty amides, fatty acids, and fatty acid derivatives in the feedstock.

Embodiment 4

The method of any of the above embodiments, further comprising: extracting a bio oil from a biomass feed comprising algae by exposing the biomass feed to water under effective hydrothermal processing conditions including a temperature of at least about 200° C., preferably at least about 250° C. or at least about 300° C., wherein the feedstock comprises the extracted bio oil, the feedstock optionally having a nitrogen content of at least about 1.5 wt %, such as at least about 2.0 wt %.

Embodiment 5

The method of any of the above embodiments, wherein the fatty acid derivatives comprise glycerides and/or the fatty amides comprise substituted fatty amides.

Embodiment 6

The method of any of the above embodiments, wherein the feedstock is exposed to the first catalyst under effective conditions to form an effluent that further comprises nitriles, the first catalyst comprising at least one of aluminum oxide, magnesium oxide, or calcium oxide, the first catalyst preferably comprising magnesium oxide, calcium oxide, or a combination thereof.

Embodiment 7

A method for processing a feedstock, comprising: exposing a pyrolysis oil feedstock with a pH of about 4 or less to a first catalyst comprising at least about 5 wt % of a rare earth metal salt, an alkali metal salt, an alkaline earth metal salt, or a combination thereof, under effective conditions to form an effluent with a pH greater than about 4; and exposing at least a portion of the effluent with a pH greater than about 4 to a hydroprocessing catalyst under effective hydroprocessing conditions to form a deoxygenated effluent.

Embodiment 8

The method of any of the above embodiments, wherein the feedstock is exposed to the first catalyst in the presence of hydrogen.

Embodiment 9

The method of any of the above embodiments, wherein the hydroprocessing catalyst comprises ZSM-48, ZSM-23, or a combination thereof, with a hydrothermally stable binder comprising titanium oxide, zirconium oxide, cerium oxide, or a combination thereof.

Embodiment 10

The method of any of the above embodiments, wherein the first catalyst comprises a clay containing at least one of a rare earth metal salt, an alkali metal salt, and an alkaline earth metal salt.

Embodiment 11

The method of any of the above embodiments, wherein the rare earth metal salt, alkali metal salt, and/or alkaline earth metal salt comprises a salt of Na, K, Rb, Cs, Mg, Ca, Sr, Ba, La, Ce, Y, or a combination thereof, the rare earth metal salt, alkali metal salt, and/or alkaline earth metal salt preferably comprising a salt of Na, K, Cs, Mg, Ca, La, or a combination thereof, and more preferably comprising a salt of Mg, Ca, or a combination thereof.

Embodiment 12

The method of any of the above embodiments, the first catalyst further comprising a hydrothermally stable support comprising titanium oxide, zirconium oxide, cerium oxide, or a combination thereof.

Embodiment 13

The method of Embodiment 12, wherein the hydrothermally stable support comprises titanium oxide or zirconium oxide, and wherein the hydroprocessing catalyst comprises a hydrothermally stable binder comprising titanium oxide.

Embodiment 14

The method of any of the above embodiments, further comprising fractionating the deoxygenated effluent to form at least a diesel boiling range fraction and a lubricant boiling range fraction.

Example of Processing Triglycerides

Figure 7:
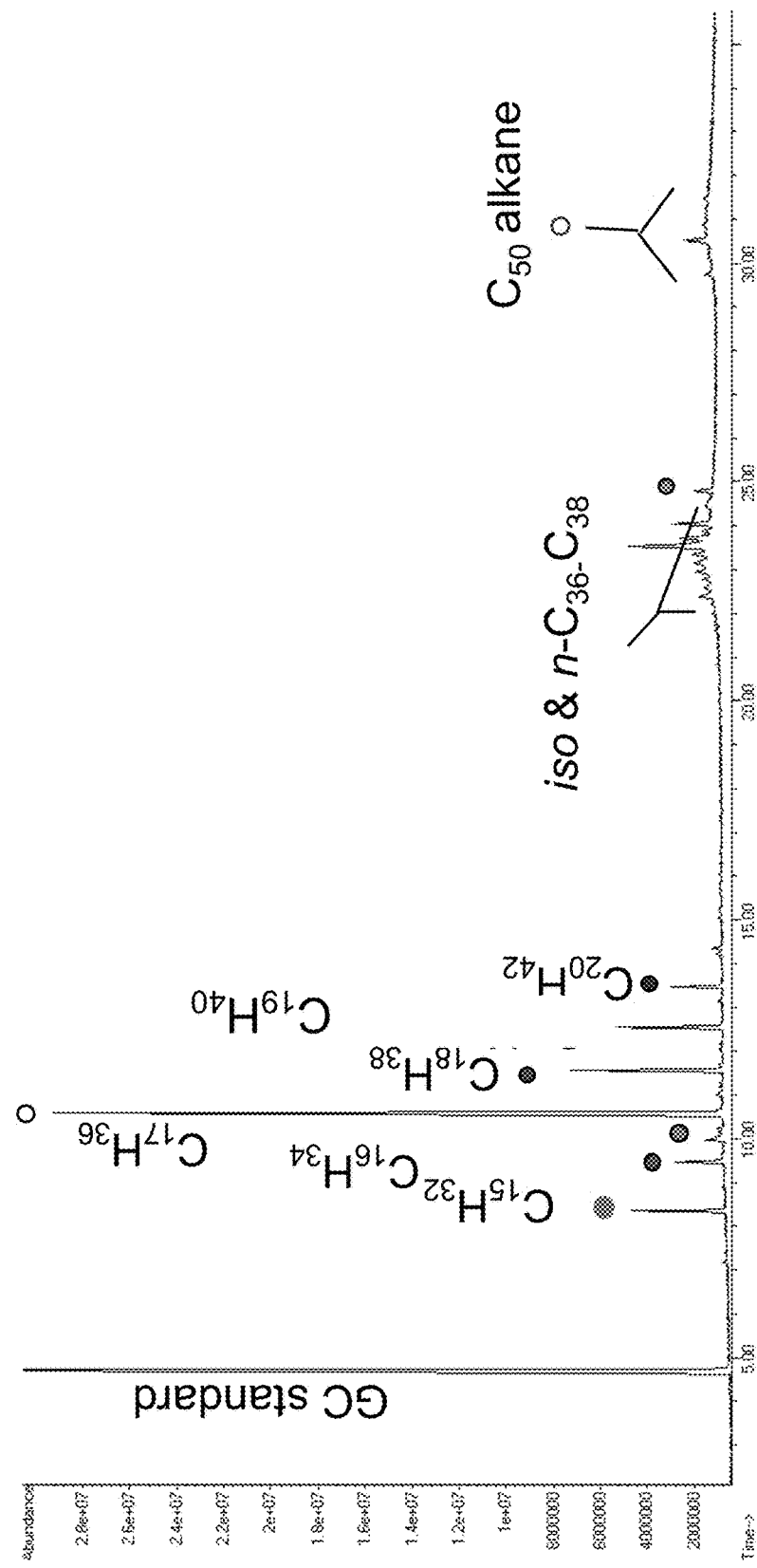
FIG. 7 shows results from processing a triglyceride-containing feed according to an aspect of the invention.

FIG. 7 shows results from the processing of a triglyceride-containing feed by exposing the feed to a mixed bed of an alkaline earth metal catalyst and a dewaxing catalyst. In this example, tristearin was exposed to a mixed catalyst bed that contained equal volumes of an alkaline earth metal catalyst and a dewaxing catalyst in a batch reaction environment. The alkaline earth metal catalyst was hydrotalcite. The dewaxing catalyst was ZSM-48 catalyst bound with $TiO_2$. The catalyst was impregnated with about 0.6 wt % of Pt as a hydrogenation metal. The tristearin feed was exposed to the mixed catalyst bed at a temperature of about 325° C. and a hydrogen partial pressure of about 400 psig (about 2.8 MPag).

FIG. 7 shows a GC/MS analysis of the reaction products generated during the reaction. In FIG. 7, the listing of components in the reaction products corresponds to the order of the appearance of the products from left to right. Thus, the left most identified product in FIG. 7 is pentadecane. As shown in FIG. 7, the majority of the product generated from the tristearin was n-heptadecane, a $C_{17}$ linear paraffin. This corresponded to the expected product if a decarbonylation or decarboxylation reaction was performed on stearic acid, a $C_{18}$ saturated carboxylic acid. The second most common product was octadecane, which corresponded to the expected product from hydrodeoxygenation of stearic acid. Some $C_{32}$-$C_{36}$ paraffins were also formed, indicating some formation of a ketone corresponding to multiple side chains. This is the reaction product that would have been expected from a stacked bed arrangement of the hydrotalcite and ZSM-48 catalysts. A small amount of $C_{36}$ ketone was also present in the reaction products, indicating incomplete deoxygenation of ketones formed by exposure of the tristearin to the hydrotalcite catalyst.

Based on FIG. 7, processing of the triglycerides in tristearin over a mixed bed of hydrotalcite and a ZSM-48 dewaxing catalyst resulted in production of about 75-80% diesel boiling range molecules and about 20-25% of lubricant boiling range molecules, with a portion of the lubricant boiling range molecules corresponding to unreacted ketone. The unreacted ketone could be removed by following a mixed catalyst bed with a short additional bed of dewaxing catalyst.

In contrast to FIG. 7, FIG. 3 shows the results from processing of the tristearin feed over a bed of only hydrotalcite. In FIG. 3, about 80% of the molecules corresponded to lubricant boiling range molecules in the form of ketones, and about 20% of the molecules corresponded to diesel boiling range ketones/paraffins. In a stacked bed configuration, the effluent from a hydrotalcite or other rare earth/alkali/alkaline earth metal catalyst can be exposed to a dewaxing catalyst. This would be expected to result in an approximately 80% lubricant boiling range molecules and 20% diesel boiling range molecules.

In still other configurations, other percentages of diesel and boiling range molecules can be achieved based on a glyceride feed (and/or glyceride/free fatty acid/fatty acid derivative feed). For example, modifying the ratio of rare earth, alkali, and/or alkaline earth metal catalyst and dewaxing catalyst in a mixed bed can allow for variation of the relative amounts of diesel and lubricant boiling range molecules. Similarly, using shorter or longer beds of the rare earth/alkali/alkaline earth metal catalyst could alter the amount of ketones formed by the rare earth/alkali/alkaline earth metal catalyst prior to exposing the feed to the dewaxing catalyst. One practical limitation on the types of configurations can be the constraint of achieving a sufficiently complete reaction. For example, it can typically be preferred to reduce the oxygen content of the feed to less than 1 wt %, for example to less than about 0.5 wt % or less than about 0.25 wt %. Reducing the oxygen concentration to these levels can typically allow a feed to be processed in other types of reactors in a refinery. Thus, it can be preferable to have sufficient amounts of dewaxing catalyst (or another hydroprocessing catalyst) toward the end of the reaction zones or catalyst beds, so that the resulting product effluent can be sufficiently deoxygenated. Having sufficient dewaxing catalyst toward the end of the reaction zones can also allow for removal of nitriles formed during the conversion reaction. Furthermore, the rare earth, alkali, and/or alkaline earth metal catalyst is believed to have greater activity for converting triglycerides (and/or other glycerides) in a feedstock to other forms. Thus, it can be preferable to have sufficient amounts of a rare earth, alkali, and/or alkaline earth metal catalyst in the early portions of the reaction zones or catalyst beds to facilitate conversion of the glycerides.

What is claimed is:

1. A method for processing an amide-containing bio oil, comprising:
   exposing a biomass feed comprising algae to water under hydrothermal processing conditions including a temperature of at least 250° C. to obtain an amide-containing bio oil containing fatty acids, fatty acid derivatives, at least about 1.5 wt % nitrogen, and at least about 10 wt % fatty amides;
   exposing the amide-containing bio oil to a first catalyst in the presence of hydrogen, wherein the first catalyst comprises at least about 5 wt % of a metal salt component containing a rare earth metal salt, an alkali metal salt, an alkaline earth metal salt, or a combination thereof under effective coupling conditions including a temperature from about 300° C. to about 450° C. to form an effluent containing ketones;
   separating the effluent containing ketones to form at least a gas phase effluent and a liquid effluent containing ketones; and
   exposing at least a portion of the liquid effluent containing ketones to a hydroprocessing catalyst under effective hydroprocessing conditions including a temperature from about 200° C. to about 450° C. to form a deoxygenated effluent,
   wherein an average carbon number of the ketones in the liquid effluent is greater than 1.5 times an average carbon number for the combined fatty amides, fatty acids, and fatty acid derivatives in the amide-containing bio oil.

2. The method of claim 1, wherein the weight percentage of ketones in the effluent containing ketones is at least 50% of the combined weight percentage of the fatty amides, the fatty acids, and the fatty acid derivatives in the amide-containing bio oil.

3. The method of claim 1, wherein the hydroprocessing catalyst comprises ZSM-48, ZSM-23, or a combination thereof, with a hydrothermally stable binder comprising titanium oxide, zirconium oxide, cerium oxide, or a combination thereof.

4. The method of claim 1, wherein the first catalyst comprises a clay containing the at least one of a rare earth metal salt, an alkali metal salt, and an alkaline earth metal salt.

5. The method of claim 1, wherein the metal salt component comprises a salt of Na, K, Rb, Cs, Mg, Ca, Sr, Ba, La, Ce, Y, or a combination thereof.

6. The method of claim 1, wherein the metal salt component comprises a salt of Mg, Ca, or a combination thereof.

7. The method of claim 1, wherein the metal salt component comprises a salt of Na, K, Cs, Mg, Ca, La, or a combination thereof, wherein the first catalyst further comprising a hydrothermally stable support comprising titanium oxide, zirconium oxide, cerium oxide, or a combination thereof.

8. The method of claim 7, wherein the hydrothermally stable support comprises titanium oxide or zirconium oxide, and wherein the hydroprocessing catalyst comprises a hydrothermally stable binder comprising titanium oxide.

9. The method of claim 1, further comprising fractionating the deoxygenated effluent to form at least a diesel boiling range fraction and a lubricant boiling range fraction.

10. The method of claim 1, wherein the fatty acid derivatives comprise glycerides.

11. The method of claim 1, wherein the fatty amides comprise substituted fatty amides.

12. The method of claim 1, wherein the amide-containing bio oil comprises at least 2 wt % nitrogen.

13. The method of claim 1, wherein the effluent containing ketones further comprises nitriles, and wherein the first catalyst further comprises a support material selected from the group consisting of aluminum oxide, magnesium oxide, calcium oxide, and a combination thereof.

14. The method of claim 13, wherein the support material is selected from the group consisting of magnesium oxide, calcium oxide, and a combination thereof.

15. The method of claim 1, wherein the hydrothermal processing conditions include a temperature of at least 275° C.

* * * * *